US011818740B2

(12) United States Patent
Yerramalli et al.

(10) Patent No.: US 11,818,740 B2
(45) Date of Patent: Nov. 14, 2023

(54) MULTIPLE BANDWIDTH PART MEASUREMENTS

(71) Applicant: QUALCOMM incorporated, San Diego, CA (US)

(72) Inventors: Srinivas Yerramalli, San Diego, CA (US); Jing Sun, San Diego, CA (US); Arumugam Chendamarai Kannan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 16/674,988

(22) Filed: Nov. 5, 2019

(65) Prior Publication Data

US 2020/0154446 A1 May 14, 2020

Related U.S. Application Data

(60) Provisional application No. 62/758,496, filed on Nov. 9, 2018.

(51) Int. Cl.
*H04W 72/542* (2023.01)
*H04W 72/044* (2023.01)
(Continued)

(52) U.S. Cl.
CPC ......... *H04W 72/542* (2023.01); *H04L 5/0051* (2013.01); *H04W 56/001* (2013.01); *H04W 72/044* (2013.01); *H04W 72/23* (2023.01)

(58) Field of Classification Search
CPC ............. H04W 72/085; H04W 72/044; H04W 56/001; H04W 72/042; H04L 5/0051
See application file for complete search history.

(56) References Cited

U.S. PATENT DOCUMENTS 10,123,335 B2    11/2018  Yerramalli et al.
2016/0127936 A1   5/2016  Chatterjee et al.
(Continued)

FOREIGN PATENT DOCUMENTS

WO  WO-2017019258       2/2017
WO  WO-2018204260 A1   11/2018
WO  WO-2018213287 A1   11/2018

OTHER PUBLICATIONS

Charter Communications: "SI Transmission in NR-U", 3GPP Draft, 3GPP TSG RAN WG1 Meeting #94, R1-1809179, SI Transmission in NR-U, 3rd Generation Partnership Project (3GPP), Mobile Competence Centre, 650, Route Des Lucioles, F-06921, Sophia-Antipolis Cedex, France, vol. RAN WG1,No. Gothenburg, Sweden, Aug. 20-Aug. 25, 2018, Aug. 11, 2018 (Aug. 11, 2018), XP051516549, 4 pages, Retrieved from the Internet: URL: http://www.3gpp.org/ftp/tsg%5Fran/WG1%5FRL1/TSGR1%5F94/Docs/R1%2D1809179%2Ezip [retrieved on Aug. 11, 2018], the whole document.
(Continued)

*Primary Examiner* — Jackie Zuniga Abad
(74) *Attorney, Agent, or Firm* — Holland & Hart LLP

(57) ABSTRACT

Methods, systems, and devices for wireless communications are described. A user equipment (UE) may receive a set of synchronization signal block (SSB) configurations for a corresponding set of frequency resource sets configured for communications in a shared frequency spectrum band. The UE may perform a listen-before-talk (LBT) procedure for each frequency resource set. If an LBT procedure is successful, the UE may select and communicate with a base station on the corresponding frequency resource sets. Accordingly, the UE may receive one or more SSBs from the base station on the selected frequency resource sets based on SSB configurations, which may indicate a floating or fixed configuration for SSBs. The UE may perform radio resource management (RRM) and radio link monitoring
(Continued)

based on receiving the SSBs in one or more of the selected frequency resource sets according to the corresponding SSB configurations.

32 Claims, 20 Drawing Sheets

(51) Int. Cl.
*H04W 56/00* (2009.01)
*H04L 5/00* (2006.01)
*H04W 72/23* (2023.01)

(56) References Cited

U.S. PATENT DOCUMENTS

| | | | |
|---|---|---|---|
| 2016/0143014 A1* | 5/2016 | Mukherjee | H04L 5/0039 370/330 |
| 2017/0041112 A1 | 2/2017 | Kim et al. | |
| 2018/0069612 A1* | 3/2018 | Yum | H04L 1/00 |
| 2018/0115996 A1* | 4/2018 | Si | H04W 74/0816 |
| 2018/0242232 A1* | 8/2018 | Chendamarai Kannan | H04B 7/0695 |
| 2019/0230706 A1* | 7/2019 | Li | H04W 72/1205 |

OTHER PUBLICATIONS

Ericsson: "BWP Impact to RLM Configuration (E396)", 3GPP Draft, 3GPP TSG-RAN WG2 #101, R2-1802780—BWP Impact to RLM (E396), vol. RAN WG2, No. Athens, Greece, Feb. 26-Mar. 2, 2018, Feb. 21, 2018 (Feb. 21, 2018), XP051400786, 4 Pages, Retrieved from the Internet: URL:http://www.3gpp.org/ftp/tsg%5Fran/WG2%5FRL2/TSGR2%5F101/Docs/ [retrieved on Feb. 21, 2018], p. 1, paragraph 2-3-p. 4, Section 3.

International Search Report and Written Opinion—PCT/US2019/060018—ISA/EPO—dated Apr. 28, 2020 (190283WO).

LG Electronics: "Summary on Frame Structure for NR- U", 3GPP TSG RAN WG1 Meeting #94bis, R1-1811877, 3rd Generation Partnership Project, Mobile Competence Centre, 650, Route Des Lucioles, F-06921 Sophia-Antipolis Cedex, France, vol. RAN WG1, No. Chengdu, China, Oct. 8, 2018-Oct. 12, 2018, Oct. 9, 2018, 14 Pages, XP051519200.

* cited by examiner

MULTIPLE BANDWIDTH PART MEASUREMENTS

CROSS REFERENCE

The present Application for Patent claims the benefit of U.S. Provisional Patent Application No. 62/758,496 by YERRAMALLI et al., entitled "MULTIPLE BANDWIDTH PART MEASUREMENTS," filed Nov. 9, 2018, assigned to the assignee hereof, and expressly incorporated herein.

BACKGROUND

The present disclosure relates to wireless communications, and more specifically to multiple bandwidth part (BWP) measurements.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a carrier may be configured for communications in the system, where the carrier includes one or more BWPs, subbands, or a combination thereof. For example, the carrier may be split into the one or more BWPs based on the size of the carrier exceeding a bandwidth threshold (e.g., greater than 20 MHz). Each of the BWPs may further include one or more subbands (e.g., sub-channels), for example where each subband is a same bandwidth (e.g., 20 MHz). Accordingly, each BWP may vary in size (e.g., in multiples of 20 MHz) based on the number of subbands located in each. The BWPs and corresponding subbands may be part of a shared (e.g., unlicensed or shared licensed) radio frequency (RF) spectrum band for which one or more wireless devices (e.g., base stations and UEs) contend. A base station may need to determine whether the carrier is available for communications in the shared RF spectrum band, for example using a listen-before-talk (LBT) procedure. Some network procedures may not be configured to accommodate communications where multiple subbands, BWPs, or a combination thereof, are configured, or the network procedure that accommodates the multiple subbands, or BWPs, or a combination thereof may be inefficient.

SUMMARY

The described techniques relate to improved methods, systems, devices, and apparatuses that support multiple bandwidth part (BWP) measurements. Generally, the described techniques provide for a user equipment (UE) to receive a set of synchronization signal block (SSB) configurations for a corresponding set of frequency resources (e.g., BWPs, sub-channels, subbands) configured for communications in a shared (e.g., unlicensed or shared licensed) frequency spectrum band. The UE, base station, or a combination thereof may perform a listen-before-talk (LBT) procedure (e.g., a clear channel assessment (CCA)) for the frequency resource sets, for example individually, in groups, or across an operating bandwidth containing multiple frequency resource sets. If the result of the LBT procedure indicates at least one of the frequency resource sets is available, the UE may select and communicate with a base station on the corresponding frequency resource set. In some cases, the UE may select multiple frequency resource sets to communicate with the base station based on each frequency resource set having a successful LBT procedure. The UE may identify or otherwise determine frequency resources (e.g., time and frequency resources) to monitor for SSBs transmitted by the base station based on the selected frequency resource sets. Accordingly, the UE may receive one or more SSBs from the base station on the selected frequency resource sets based on an SSB configuration that corresponds to the selected frequency resource set or sets. In some cases, the SSB configurations may indicate a floating configuration for SSBs in measurement windows of the corresponding frequency resource sets or a fixed configuration for SSBs outside of measurement windows in the corresponding frequency resources sets.

The UE may perform radio resource management (RRM) and radio link monitoring (RLM) based on receiving the SSBs in one or more of the selected frequency resource sets according to the corresponding SSB configurations. For example, the UE may determine timing information for SSBs in the one or more selected frequency resource sets based on previous measurements, determine which SSBs are fixed or floating based on an indication from the base station, measure the SSBs based on a priority of the selected frequency resource sets, combine measurement values (e.g., channel quality metrics) for one or more of the selected frequency resources sets, or a combination thereof as part of the RRM. Additionally, the UE may perform RLM based on indication of an RLM configuration for the selected frequency resource sets. For example, the UE may monitor one chosen frequency resource set of the selected frequency resource sets as part of the RLM. Additionally or alternatively, the UE may monitor more than one frequency resource set of the selected frequency resource sets. In some cases, the UE may monitor a time-division multiplexed (TDM) pattern across the selected frequency resource sets. Additionally, the UE may determine and report a link quality for each of the selected frequency resource sets. Based on the reported link qualities, the base station may activate and/or deactivate a frequency resource set. In some cases, the base station may also combine the results of the reported link qualities to derive an overall cell quality.

The UE may also perform RLM for a carrier (e.g., a component carrier) configured for communications on multiple frequency resource sets (e.g., BWPs, subbands, or a combination thereof) in a shared (e.g., unlicensed or shared licensed) frequency spectrum band. The base station may transmit to the UE an indication of the RLM configuration for the frequency resource sets, where the RLM configuration may apply across the multiple frequency resource sets, or be individualized and indicate specific RLM configurations per frequency resource set, or for groups of frequency resource sets. The UE may then determine time and frequency resources to monitor for reference signals for at least one frequency resource set, then the UE may monitor such resources.

A method of wireless communication at a UE is described. The method may include identifying that the UE is configured to use a set of frequency resource sets of a component carrier to communicate in a shared radio frequency spectrum band, receiving an indication of a radio link monitoring configuration for the set of frequency resource sets, determining, based on the received indication, a set of time and frequency resources to monitor for reference signals for at least one frequency resource set of the set of frequency resource sets, and monitoring the at least one frequency resource set for reference signals according to the determined set of time and frequency resources.

An apparatus for wireless communication at a UE is described. The apparatus may include a processor, memory coupled with the processor, and instructions stored in the memory. The instructions may be executable by the processor to cause the apparatus to identify that the UE is configured to use a set of frequency resource sets of a component carrier to communicate in a shared radio frequency spectrum band, receive an indication of a radio link monitoring configuration for the set of frequency resource sets, determine, based on the received indication, a set of time and frequency resources to monitor for reference signals for at least one frequency resource set of the set of frequency resource sets, and monitor the at least one frequency resource set for reference signals according to the determined set of time and frequency resources.

Another apparatus for wireless communication at a UE is described. The apparatus may include means for identifying that the UE is configured to use a set of frequency resource sets of a component carrier to communicate in a shared radio frequency spectrum band, receiving an indication of a radio link monitoring configuration for the set of frequency resource sets, determining, based on the received indication, a set of time and frequency resources to monitor for reference signals for at least one frequency resource set of the set of frequency resource sets, and monitoring the at least one frequency resource set for reference signals according to the determined set of time and frequency resources.

A non-transitory computer-readable medium storing code for wireless communication at a UE is described. The code may include instructions executable by a processor to identify that the UE is configured to use a set of frequency resource sets of a component carrier to communicate in a shared radio frequency spectrum band, receive an indication of a radio link monitoring configuration for the set of frequency resource sets, determine, based on the received indication, a set of time and frequency resources to monitor for reference signals for at least one frequency resource set of the set of frequency resource sets, and monitor the at least one frequency resource set for reference signals according to the determined set of time and frequency resources.

In some examples of the method, apparatuses, and non-transitory computer-readable medium described herein, the set of frequency resource sets include a set of BWPs, and the at least one frequency resource set includes at least one of the set of BWPs.

In some examples of the method, apparatuses, and non-transitory computer-readable medium described herein, the set of frequency resource sets includes a set of sub-bands, and the at least on frequency resource set includes at least one of the set of sub-bands.

In some examples of the method, apparatuses, and non-transitory computer-readable medium described herein, the received indication identifies the at least one frequency resource set of the set of frequency resource sets to be monitored by the UE.

In some examples of the method, apparatuses, and non-transitory computer-readable medium described herein, determining the set of time and frequency resources to monitor for reference signals may include operations, features, means, or instructions for determining the set of time and frequency resources of a single frequency resource set of the set of frequency resource sets to monitor for reference signals, the received indication identifying that one frequency resource set may be to be monitored.

In some examples of the method, apparatuses, and non-transitory computer-readable medium described herein, determining the set of time and frequency resources to monitor for reference signals may include operations, features, means, or instructions for determining the set of time and frequency resources of the set of frequency resource sets to monitor for reference signals, the received indication identifying that multiple frequency resource sets may be to be monitored.

In some examples of the method, apparatuses, and non-transitory computer-readable medium described herein, determining the set of time and frequency resources to monitor for reference signals may include operations, features, means, or instructions for determining, based on the received indication of the radio link monitoring configuration, a time division multiplexed pattern of time and frequency resources of the set of frequency resource sets to be monitored for reference signals, the set of time and frequency resources including at least one set of time and frequency resources in each of the set of frequency resource sets.

Some examples of the method, apparatuses, and non-transitory computer-readable medium described herein may further include operations, features, means, or instructions for receiving one or more reference signals on a set of frequency resource sets of the at least one frequency resource set, determining, based on the received one or more reference signals, a link quality value for each of the set of frequency resource sets, and identifying whether the UE may be synchronized based on the determined link quality values.

In some examples of the method, apparatuses, and non-transitory computer-readable medium described herein, identifying whether the UE may be synchronized based on the determined link quality values may include operations, features, means, or instructions for identifying that the UE may be synchronized based on determining that each of the set of determined link quality values satisfy a link quality threshold, or identifying that the UE may be not synchronized based on determining that all of the set of determined link quality values fail to satisfy the link quality threshold.

Some examples of the method, apparatuses, and non-transitory computer-readable medium described herein may further include operations, features, means, or instructions for identifying a frequency resource set of the set of frequency resource sets that lacks a configuration for reference signal monitoring, and determining a link quality for the identified frequency resource set based on a transmission configuration state for the identified frequency resource set.

Some examples of the method, apparatuses, and non-transitory computer-readable medium described herein may further include operations, features, means, or instructions for determining a link quality associated with each of the at least one frequency resource set, and transmitting a report of the determined link quality.

Some examples of the method, apparatuses, and non-transitory computer-readable medium described herein may further include operations, features, means, or instructions for receiving, in response to the transmitted report, a command for the UE to deactivate one or more of the set of frequency resource sets.

In some examples of the method, apparatuses, and non-transitory computer-readable medium described herein, the shared radio frequency spectrum band includes an unlicensed radio frequency spectrum band, or a shared licensed radio frequency spectrum band, or a combination thereof.

In some examples of the method, apparatuses, and non-transitory computer-readable medium described herein, the reference signals include SSBs.

A method of wireless communication at a base station is described. The method may include determining, for a UE configured to use a set of frequency resource sets of a component carrier to communicate in a shared radio frequency spectrum band with the base stations, a set of time and frequency resources for the UE to monitor for reference signals for at least one frequency resource set of the set of frequency resource sets and transmitting, to the UE, an indication of a radio link monitoring configuration for the set of frequency resource sets that indicates the determined set of time and frequency resources.

An apparatus for wireless communication at a base station is described. The apparatus may include a processor, memory coupled with the processor, and instructions stored in the memory. The instructions may be executable by the processor to cause the apparatus to determine, for a UE configured to use a set of frequency resource sets of a component carrier to communicate in a shared radio frequency spectrum band with the base stations, a set of time and frequency resources for the UE to monitor for reference signals for at least one frequency resource set of the set of frequency resource sets and transmit, to the UE, an indication of a radio link monitoring configuration for the set of frequency resource sets that indicates the determined set of time and frequency resources.

Another apparatus for wireless communication at a base station is described. The apparatus may include means for determining, for a UE configured to use a set of frequency resource sets of a component carrier to communicate in a shared radio frequency spectrum band with the base stations, a set of time and frequency resources for the UE to monitor for reference signals for at least one frequency resource set of the set of frequency resource sets and transmitting, to the UE, an indication of a radio link monitoring configuration for the set of frequency resource sets that indicates the determined set of time and frequency resources.

A non-transitory computer-readable medium storing code for wireless communication at a base station is described. The code may include instructions executable by a processor to determine, for a UE configured to use a set of frequency resource sets of a component carrier to communicate in a shared radio frequency spectrum band with the base stations, a set of time and frequency resources for the UE to monitor for reference signals for at least one frequency resource set of the set of frequency resource sets and transmit, to the UE, an indication of a radio link monitoring configuration for the set of frequency resource sets that indicates the determined set of time and frequency resources.

In some examples of the method, apparatuses, and non-transitory computer-readable medium described herein, the set of frequency resource sets include a set of BWPs, and the at least one frequency resource set includes at least one of the set of BWPs.

In some examples of the method, apparatuses, and non-transitory computer-readable medium described herein, the set of frequency resource sets includes a set of sub-bands, and the at least one frequency resource set includes at least one of the sets of sub-bands.

In some examples of the method, apparatuses, and non-transitory computer-readable medium described herein, the transmitted indication identifies the at least one frequency resource set of the set of frequency resource sets to be monitored by the UE.

In some examples of the method, apparatuses, and non-transitory computer-readable medium described herein, determining the set of time and frequency resources for the UE to monitor for reference signals may include operations, features, means, or instructions for determining the set of time and frequency resources of a single frequency resource set of the set of frequency resource sets to monitor for reference signals, the transmitted indication identifying that one frequency resource set may be to be monitored.

In some examples of the method, apparatuses, and non-transitory computer-readable medium described herein, determining the set of time and frequency resources for the UE to monitor for reference signals may include operations, features, means, or instructions for determining the set of time and frequency resources of the set of frequency resource sets for the UE to use to monitor for reference signals, the transmitted indication identifying that multiple frequency resource sets may be to be monitored.

In some examples of the method, apparatuses, and non-transitory computer-readable medium described herein, determining the set of time and frequency resources for the UE to monitor for reference signals may include operations, features, means, or instructions for determining a time division multiplexed pattern of time and frequency resources of the set of frequency resource sets for the UE to monitor for reference signals, the set of time and frequency resources including at least one set of time and frequency resources in each of the set of frequency resource sets.

In some examples of the method, apparatuses, and non-transitory computer-readable medium described herein, the reference signals include SSBs.

DETAILED DESCRIPTION

Figure 1:
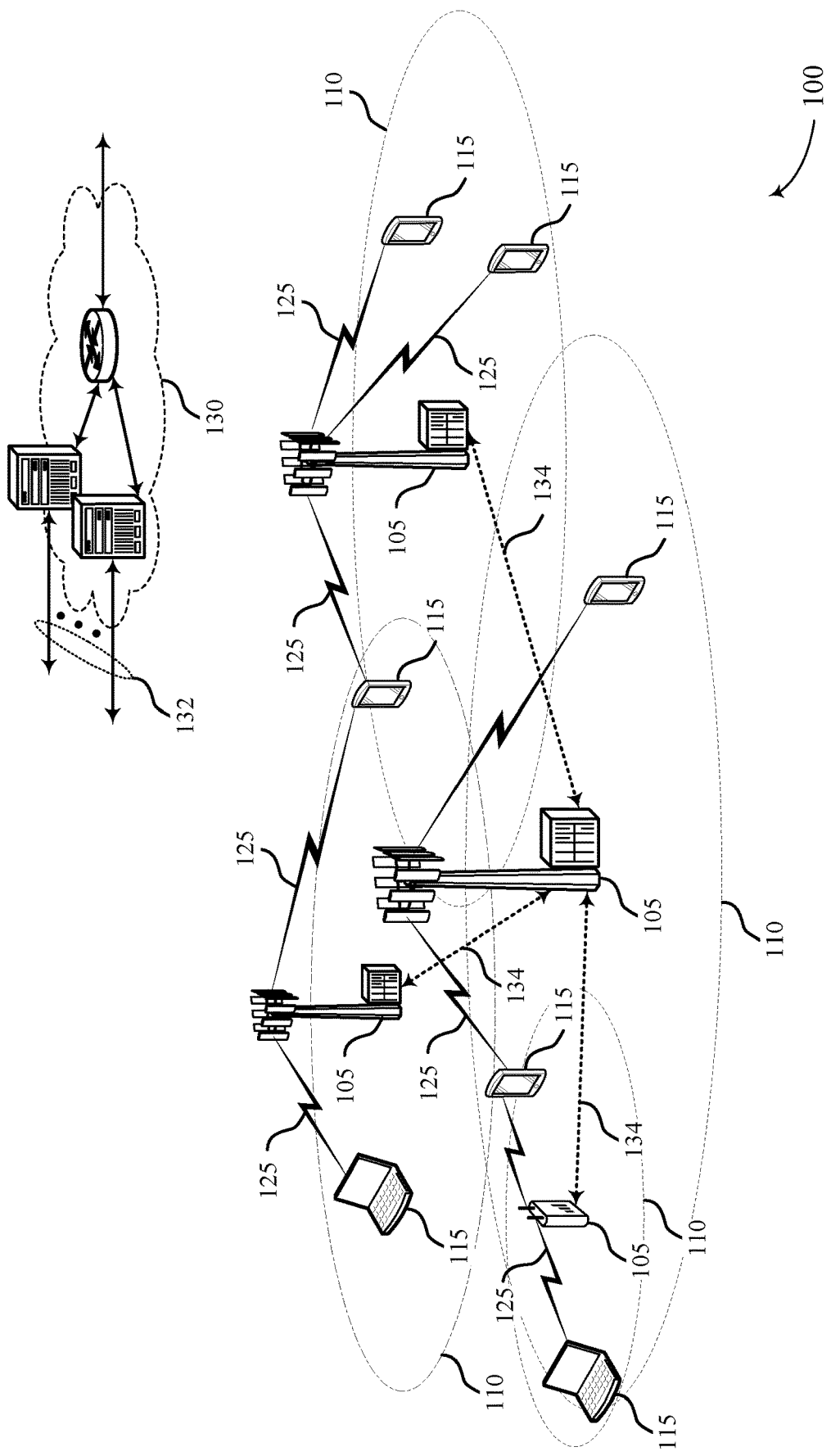
FIG. 1 illustrates an example of a system for wireless communications that supports multiple bandwidth part (BWP) measurements in accordance with aspects of the present disclosure.

In some wireless communications systems, a user equipment (UE) and a base station may attempt to communicate on a shared radio frequency spectrum band. Prior to communicating, the base station, or the UE, or a combination thereof may perform a listen-before-talk (LBT) procedure to determine if the shared radio frequency spectrum band is available for communications. In some cases, the shared radio frequency spectrum band may be split into one or more bandwidth parts (BWPs), where the LBT procedure may be performed per BWP. Additionally or alternatively, each BWP may include one or more subbands (e.g., sub-channels, or other form of frequency resource sets), where the LBT procedure is performed per each subband. Accordingly, the subsequent communications may be performed on any subband that has a successful LBT procedure performed on it. For example, multiple subbands may be activated for the subsequent communications based on the successful LBT procedures. In some cases, the base station may transmit one or more synchronization signal blocks (SSBs) on one or more activated subbands, where each subband may include a corresponding SSB configuration that may include how the SSBs may be transmitted on each subband. For example, the SSBs may be transmitted according to a floating configuration within a measurement window or according to a fixed configuration outside of the measurement window. Accordingly, based on the SSB configurations and the multiple activated subbands, the UE may perform different measurements, monitor for different signals, or a combination thereof.

In some cases, the UE may perform radio resource management (RRM) and radio link monitoring (RLM) based on receiving SSBs in one or more of the activated subbands according to their corresponding SSB configurations. For example, the UE may determine timing information for SSBs in the one or more activated subbands based on previous measurements, determine which SSBs are fixed or floating based on an indication from the base station, measure the SSBs based on a priority of the activated subbands, combine measurements values (e.g., channel quality metrics) for one or more of the activated subbands, or a combination thereof as part of the RRM. Additionally, the UE may perform RLM based on indication of an RLM configuration for the activated subbands. For example, the UE may monitor one chosen subband of the activated subbands as part of the RLM. Additionally or alternatively, the UE may monitor more than one subband of the activated subbands. In some cases, the UE may monitor a time-division multiplexed (TDM) pattern across the activated subbands. Additionally, the UE may determine and report a link quality for each of the activated subbands. Based on the reported link qualities, the base station may activate, or deactivate a subband. In some cases, the base station may also combine the results of the reported link qualities to derive an overall cell quality for the UE.

The UE may also perform RLM for a carrier (e.g., a component carrier) configured for communications on multiple frequency resource sets (e.g., BWPs, subbands, or a combination thereof) in a shared (e.g., unlicensed or shared licensed) frequency spectrum band. The base station may transmit to the UE an indication of the RLM configuration for the frequency resource sets, where the RLM configuration may apply across the multiple frequency resource sets, or be individualized and indicate specific RLM configurations per frequency resource set, or for groups of frequency resource sets. The UE may then determine time and frequency resources to monitor for reference signals for at least one frequency resource set, then the UE may monitor such resources.

Particular aspects of the subject matter described herein may be implemented to realize one or more advantages. The described techniques may support improvements in the LBT, RLM, or RRM framework, or a combination thereof. The described techniques may support LBT procedures that accommodate communications where multiple subband, multiple BWPs, or a combination thereof, are configured. The described techniques may also increase efficiency, among other advantages. As such, supported techniques may include improved network operations and, in some examples, may promote network efficiencies, among other benefits.

Aspects of the disclosure are initially described in the context of a wireless communications system. An additional wireless communications system, a floating SSB configuration, a fixed SSB configuration, and process flow examples are then provided to illustrate aspects of the disclosure. Aspects of the disclosure are further illustrated by and described with reference to apparatus diagrams, system diagrams, and flowcharts that relate to multiple BWP measurements.

FIG. 1 illustrates an example of a wireless communications system 100 that supports multiple BWP measurements in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Devices in wireless communications system 100 may communicate over unlicensed spectrum, which may be a portion of spectrum that includes frequency bands traditionally used by Wi-Fi technology, such as the 5 GHz band, the 2.4 GHz band, the 60 GHz band, the 3.6 GHz band, and/or the 900 MHz band. The unlicensed spectrum may also include other frequency bands, including shared licensed spectrum bands.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

For communications between a UE 115 and a base station 105, an available bandwidth of frequencies for the communications may be split into BWPs that are subsets of the available bandwidth of frequencies. A BWP may be a bandwidth where the UE 115 can transmit and/or receive information. In conventional systems, a maximum number of four (4) BWPs may be configured to the UE 115. Each BWP may include one or more subbands (e.g., subbands). Additionally, the UE 115 may monitor a single, active BWP at a time, where the active BWP is determined based on an LBT procedure (e.g., a clear channel assessment (CCA)).

In some wireless communications systems (e.g., NR), a carrier (e.g., up to 100 MHz) may be configured for unlicensed communications in the system (e.g., NR unlicensed (NR-U)), where the carrier is divided into multiple BWPs, subbands, or a combination thereof (e.g., multiples of 20 MHz sections of the carrier). The base station 105 may perform an LBT procedure per BWP, subband, or a combination thereof, to determine which BWPs, subbands, or a combination thereof, are available (e.g., can be used) for a current transmit opportunity, where the transmit opportunity may represent an amount of time the base station 105 may send frames when the base station 105 has won contention for a wireless medium. When operating in shared radio frequency spectrum bands (e.g., unlicensed or shared licensed radio frequency spectrum bands), wireless devices such as base stations 105 and UEs 115 may employ LBT procedures to ensure a frequency channel (e.g., subband) is clear before transmitting data. For example, the base station 105 may listen to a subband, and if no communications are detected on the subband or any frequency channel on the subband, the subband may be determined to be available for subsequent communications. Additionally or alternatively, if communications are detected on a subband or any channel on the subband, the subband may be determined to be unavailable for the subsequent communications. In some cases, the LBT procedure may be performed on any frequency resource set (e.g., BWP, subband) to determine if the frequency resource set is available for subsequent communications.

As noted above, a UE 115 may be configured to monitor a single, active BWP (e.g., active frequency resource set) at a time. However, after performing the LBT procedures on each subband for all configured BWPs, multiple subbands may be available to be active for subsequent communications. In some cases, one or more of the available subbands may be used for communications to increase the reliability that transmissions are successfully transmitted and received at the UE 115. For example, the base station 105 may transmit one or more SSBs in each of the available subbands to enable the UE 115 to synchronize with the base station 105 by increasing the chances that the UE 115 may receive an SSB. Based on the multiple activated subbands, the SSBs may be transmitted in different configurations, and the UE 115 may monitor, perform measurements, perform RLM, or a combination thereof based on the different configurations.

Wireless communications system 100 may support efficient techniques for configuring SSB transmissions per activated subband. For example, a base station 105 may transmit one or more SSBs on the multiple activated subbands, where each subband may include a corresponding SSB configuration that may include how the SSBs are transmitted on each subband. For example, the SSBs may be transmitted according to a floating configuration within a measurement window or according to a fixed configuration outside of the measurement window. Accordingly, based on the SSB configurations and the multiple activated subbands, a UE 115 may perform different measurements, monitor for different signals, or a combination thereof. In some cases, the UE may perform RRM and RLM based on receiving SSBs in one or more of the activated subbands according to their corresponding SSB configurations.

Figure 2:
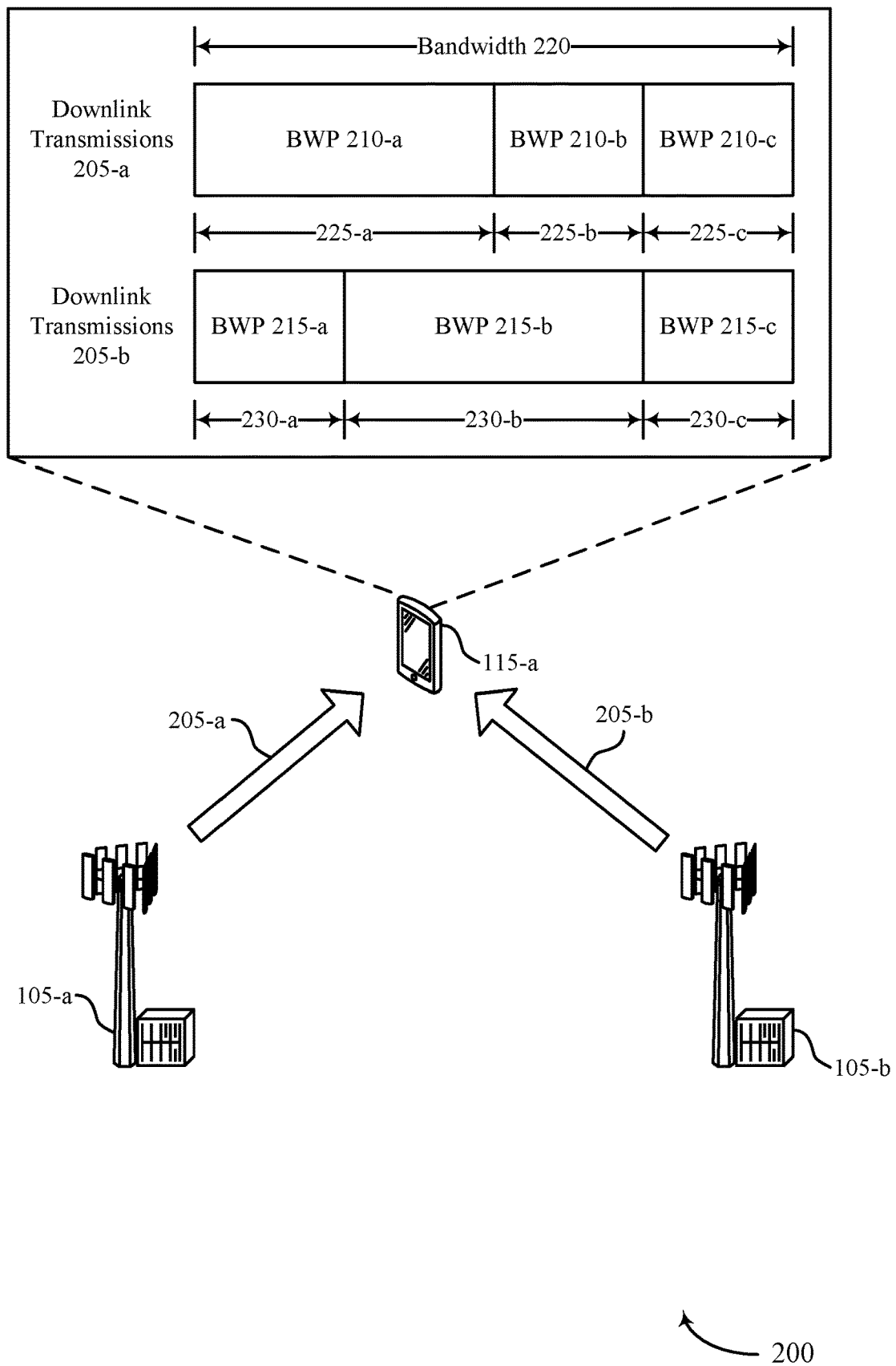
FIG. 2 illustrates an example of a wireless communications system that supports multiple BWP measurements in accordance with aspects of the present disclosure.

FIG. 2 illustrates an example of a wireless communications system 200 that supports multiple BWP measurements in accordance with aspects of the present disclosure. In some examples, wireless communications system 200 may implement aspects of wireless communications system 100. Wireless communications system 200 may include a first base station 105-a, a second base station 105-b, and a UE 115-a, which may be examples of corresponding base stations 105 and UEs 115, respectively, as described above with reference to FIG. 1. In some cases, base stations 105-a and 105-b may attempt to communicate with UE 115-a on a shared radio frequency spectrum band.

Accordingly, base station 105-a may transmit one or more downlink transmissions 205-a to UE 115-a, and base station 105-b may transmit one or more downlink transmissions 205-b to UE 115-a. However, based on operating in the shared radio frequency spectrum band, each base station 105, or UE 115-a, or a combination thereof may perform LBT procedures to determine if the spectrum band is available for communications prior to transmitting the respective downlink transmissions 205.

An unlicensed spectrum (e.g., NR unlicensed (NR-U) spectrum) may support a serving cell (e.g., base station 105-a or 105-b) that is configured with a bandwidth 220 larger than a bandwidth threshold value (e.g., 20 MHz). As described herein, the bandwidth 220 may be configured to include one or more BWPs 210 or 215 (e.g., each in multiples of 20 MHz). For downlink operations, different options for BWP-based operations within a carrier at the serving cell may be considered when the bandwidth 220 is larger than the bandwidth threshold value. In a first option (e.g., Option 1A), multiple BWPs 210 or 215 may be configured, multiple BWPs 210 or 215 may be activated, and the serving cell may transmit a physical downlink shared channel (PDSCH) on one or more of the activated BWPs 210 or 215. In a second option (e.g., Option 1B), multiple BWPs 210 or 215 may be configured, multiple BWPs 210 or 215 may be activated, and the serving cell may transmit a PDSCH on one of the activated BWPs 210 or 215.

In a third option (e.g., Option 2), multiple BWPs 210 or 215 may be configured, a single BWP 210 or 215 may be activated, and the serving cell may transmit a PDSCH on the single activated BWP 210 or 215 if a CCA (e.g., an LBT procedure) is successful for at least a portion of the single activated BWP 210 or 215. In a fourth option (e.g., Option 3), multiple BWPs 210 or 215 may be configured, a single BWP 210 or 215 may be activated, and the serving cell may transmit a PDSCH on parts of or the whole of the single activated BWP 210 or 215 based on successful CCAs of the parts of the single activated BWP 210 or 215. For example, the serving cell may determine if a CCA is successful or not in multiples of 20 MHz (e.g., per subband), where each BWP 210 or 215 may include one or more multiples of 20 MHz. As such, a portion of the total BWP 210 or 215 may be determined to be available for subsequent communications (e.g., based on a successful CCA, LBT).

The BWPs 210 or 215, or subbands may be referred to as frequency resource sets. Accordingly, when operating in unlicensed spectrum or shared licensed spectrum, a base station 105 may perform a CCA procedure (e.g., LBT procedure) for each frequency resource set. For example, the base station 105 may perform the CCA for an entire BWP 210 or 215. Additionally or alternatively, the base station 105 may perform the CCA for each subband within a BWP 210 or 215.

In some cases, different base stations 105 may partition a bandwidth into different sized BWPs. For example, base station 105-a may partition the bandwidth 220 (e.g., an 80 MHz) bandwidth into a first BWP 210-a with a first size 225-a (e.g., 40 MHz), a second BWP 210-b with a second size 225-b (e.g., 20 MHz), and a third BWP 210-c with a third size (e.g., 20 MHz). Additionally or alternatively, base station 105-b may partition the same bandwidth 220 (e.g., the same 80 MHz bandwidth) into a first BWP 215-*a* with a first size 230-*a* (e.g., 20 MHz), a second BWP 215-*b* with a second size 230-*b* (e.g., 40 MHz), and a third BWP 215-*c* with a third size 230-*c* (e.g., 20 MHz). As noted, each subband (e.g., or any configured channel for sensing a bandwidth) may be a same bandwidth (e.g., 20 MHz), and a base station 105 may activate one or more of the subbands in its configured BWPs 210 or 215 based on a corresponding CCA outcome. Based on one or more of the subbands being activated, additional aspects may be determined for the one or more activated subbands. For example, SSB transmissions, RLM, and RRM may be configured based on the one or more activated subbands.

In conventional systems, for one active subband (e.g., or BWP 210 or 215), SSB transmissions may occur at floating locations within a measurement window or may occur at fixed locations outside of the measurement window (e.g., opportunistic SSB transmissions). For example, the floating locations may be based on time shifting SSBs to after a successful LBT procedure is observed. These floating SSB transmissions may occur in a measurement window configured for SSBs and a physical broadcast channel (PBCH) (e.g., an SS/PBCH block measurement time configuration (SMTC) window) or for demodulation reference signals (DRS) (e.g., DRS measurement time configuration (DMTC) window). Additionally or alternatively, a base station may transmit the SSBs for the one active subband at other time instances outside of the measurement windows. These SSB transmissions may be opportunistic and occur when the active subband is free and available for communications.

Figure 3:
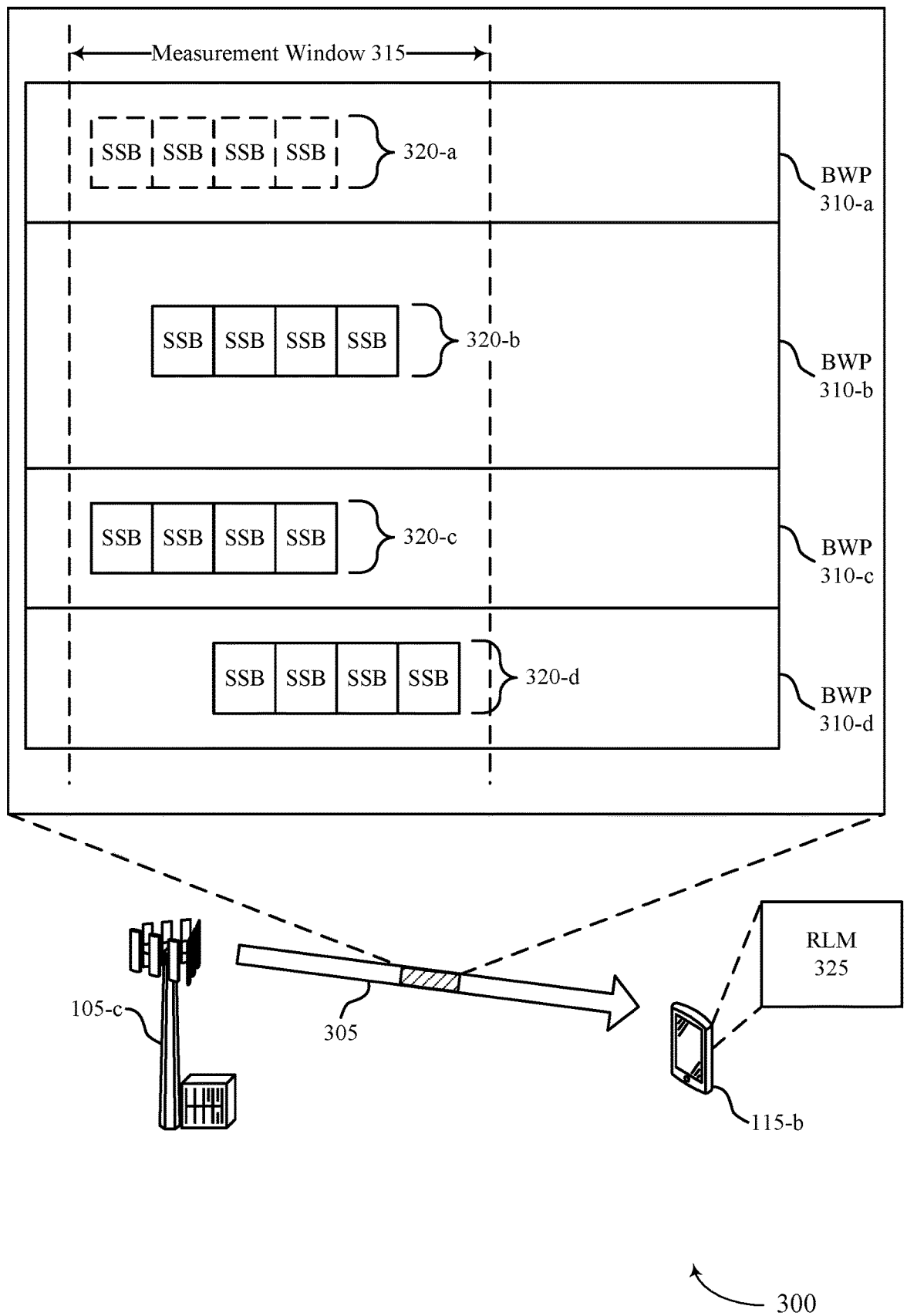
FIG. 3 illustrates an example of a floating BWP configuration that supports multiple BWP measurements in accordance with aspects of the present disclosure.

FIG. 3 illustrates an example of a floating SSB configuration 300 that supports multiple BWP measurements in accordance with aspects of the present disclosure. In some examples, floating SSB configuration 300 may implement aspects of wireless communications systems 100 and/or 200. Floating SSB configuration 300 may include a base station 105-*c* and a UE 115-*b*, which may be examples of corresponding base stations 105 and UEs 115, respectively, as described above with reference to FIGS. 1 and 2. Base station 105-*c* may transmit downlink information to UE 115-*b* on a carrier 305, where the carrier 305 is split into one or more BWPs 310. While BWPs 310 are shown in FIG. 3, it is to be understood that floating SSB configuration 300 may apply to different frequency resource sets (e.g., subbands, subbands).

If base station 105-*c* has multiple active BWPs 310 (e.g., subbands, active frequency resource sets) for each UE 115 base station 105-*c* communicates with and each BWP 310 is subject to an LBT independently, base station 105-*c* may configure how an SSB 320 is transmitted for each BWP 310 (e.g., if an SSB is transmitted in that BWP or subband). For example, some BWPs 310 (e.g., subbands) may be configured with floating SSBs 320. If a floating SSB 320 is configured for a BWP 310, all SSBs may be transmitted in a measurement window 315 (e.g., SMTC or DMTC window), but the location of the floating SSBs 320 may be dependent on the LBT outcome for the BWP 310 (e.g., transmitted after a successful LBT is observed), which may increase overhead signaling.

Base station 105-*c* may transmit one or more SSBs 320 to enable UE 115-*b* to synchronize with base station 105-*c*. For example, UE 115-*b* may perform an initial access procedure or perform measurements to improve communications with base station 105-*c* based on the SSBs 320. Base station 105-*c* may transmit the one or more SSBs 320 in an SSB burst that includes a set number of SSBs 320 (e.g., four (4) SSBs). As described herein, the SSB burst may be transmitted in an unlicensed frequency spectrum band, where base station 105-*c* may perform an LBT procedure to determine if the BWP 310 is available prior to transmitting the SSB burst. If the LBT procedure indicates that the BWP 310 is occupied or unavailable, the base station may be unable to transmit one or more SSBs 320 in the SSB burst. For example, in BWP 310-*a*, an unsuccessful LBT procedure may lead to no SSBs 320-*a* being transmitted from base station 105-*c* to UE 115-*b*. In such cases, base station 105-*c* may transmit an additional SSB burst within a same SSB transmission period as the initial SSB burst to increase the transmission likelihood of the SSBs 320 and to compensate for the one or more SSBs 320 that may not be correctly transmitted. Alternatively, the LBT procedure may indicate that the BWP 310 is available, and base station 105-*c* may transmit the SSBs 320 at their initially configured time. For example, BWP 310-*c* may be determined to be available, and SSBs 320-*c* may be transmitted according to an initially configured time.

Additionally or alternatively, the SSB burst may be delayed and transmitted at later times than planned or configured based on an LBT not passing (e.g., indicating the channel is unavailable) to improve chances that the SSBs are properly transmitted. For example, SSBs 320-*b* in BWP 310-*b* and SSBs 320-*d* in BWP 310-*d* may be transmitted at a delayed or time shifted instance with respect to the initially configured time for transmitting SSBs 320 in measurement window 315 based on when corresponding LBT procedures are successful in BWPs 310-*b* and 310-*d*. In some cases, the order of SSBs may differ between SSB bursts within an SSB transmission period. For example, a first SSB burst within an SSB transmission period may have a first order of SSBs, and a second SSB burst within the SSB transmission period may have a second order of SSBs. As such, if one or more SSBs at the beginning of the first SSB burst are not transmitted based on not passed LBTs, the likelihood that the same SSBs are transmitted may be increased based on them occurring later in the order of the second SSB burst.

In some cases, base station 105-*c* may configure all SSBs to be transmitted according to the floating configuration or a fixed location configuration (e.g., non-floating) irrespective of which BWP 310 the SSB is located in. Additionally, different BWPs 310 may also have different periodicities of configured SSBs. Accordingly, UE 115-*b* may perform rate matching (and determine a transport block size (TBS)) for a PDSCH depending on the SSB configuration for each BWP 310. Base station 105-*c* may signal this configuration via higher layer signaling (e.g., RRC signaling) or with SSB configuration signaling. Additionally, UE 115-*b* may perform an RLM 325 based on the SSBs 320 transmitted in one or each BWP 310.

Figure 4:
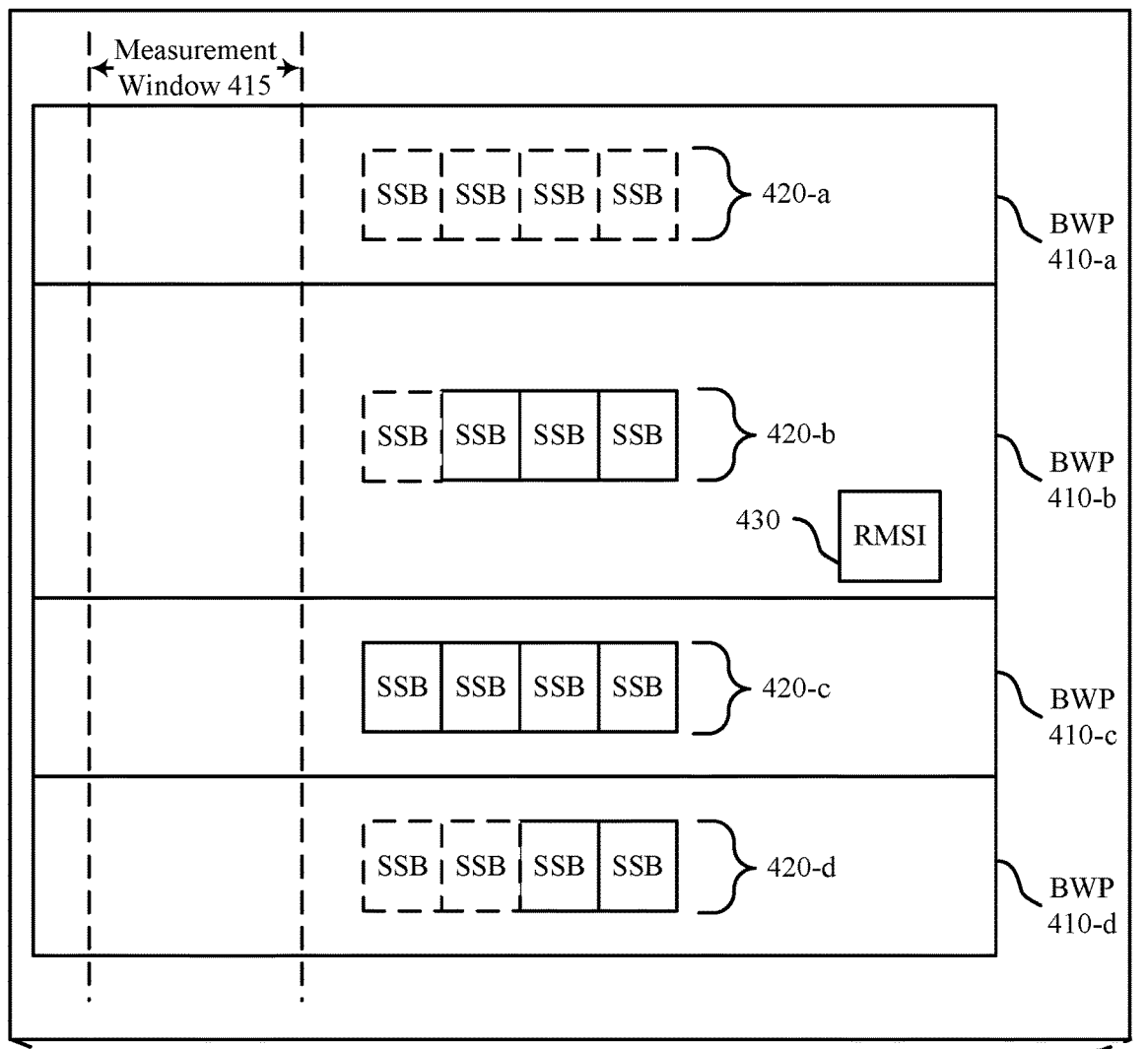
FIG. 4 illustrates an example of a fixed BWP configuration that supports multiple BWP measurements in accordance with aspects of the present disclosure.
Figure 4:
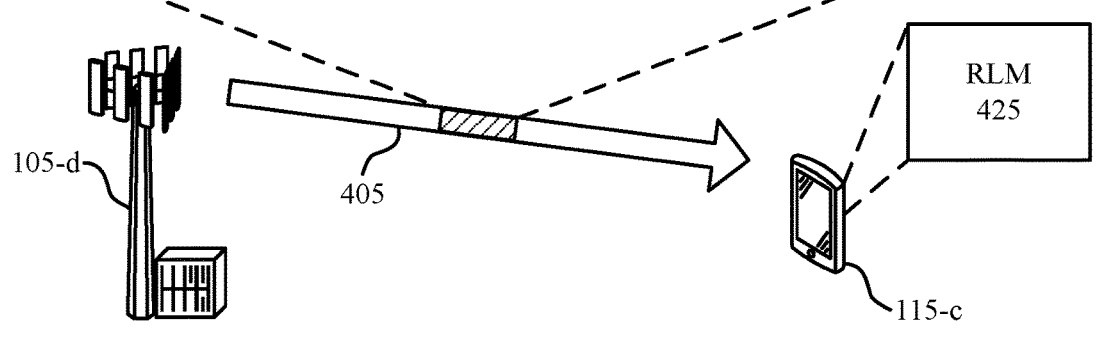

FIG. 4 illustrates an example of a fixed SSB configuration 400 that supports multiple BWP measurements in accordance with aspects of the present disclosure. In some examples, fixed SSB configuration 400 may implement aspects of wireless communications systems 100 and/or 200. Fixed SSB configuration 400 may include a base station 105-*d* and a UE 115-*c*, which may be examples of corresponding base stations 105 and UEs 115, respectively, as described above with reference to FIGS. 1-3. Base station 105-*d* may transmit downlink information to UE 115-*c* on a carrier 405, where the carrier 405 is split into one or more BWPs 410. While BWPs 410 are shown in FIG. 4, it is to be understood that fixed SSB configuration 400 may apply to different frequency resource sets (e.g., sub-channels, subbands) similar to floating SSB configuration 300 as described above.

If base station 105-*d* has multiple active BWPs 410 (e.g., active sub-channels, subbands, frequency resource sets) for each UE 115 base station 105-*d* communicates with and each BWP 410 is subject to an LBT independently, base station 105-*d* may configure how an SSB 420 is transmitted for each BWP 410 (e.g., if an SSB is transmitted in that BWP or subband). For example, some BWPs 410 (e.g., subbands) may be configured with opportunistic SSBs 420 at fixed locations outside of a measurement window 415 (e.g., SMTC or DMTC window). If a fixed SSB location is configured for a BWP 410, base station 105-*d* may or may not transmit the corresponding SSBs 420 based on when an LBT procedure is determined to be successful. For example, for BWP 410-*a*, the LBT procedure may never be successful, and SSBs 420-*a* may not be transmitted. For BWP 410-*b*, the LBT procedure may be determined to be successful later in time, resulting in one SSB of the SSBs 420-*b* to not be transmitted. Alternatively, for BWP 410-*c*, the LBT procedure may be determined to be successful before the fixed location of SSBs 420-*c*, and all SSBs 420-*c* may be transmitted. For BWP 410-*d*, the LBT procedure may be determined to be successful at a later time than for BWP 410-*b*, and, as such, two SSBs of SSBs 420-*d* may not be transmitted.

If some BWPs 410 have non-cell defining SSBs and other BWPs 410 have cell defining SSBs, an indication of a location for remaining minimum system information (RMSI) 430 may be signaled to UE 115-*c*. For example, an SSB 420 may indicate that this SSB 420 is not floating (e.g., an SSB 420-*b*) and may ask UE 115-*c* to monitor a separate frequency for RMSI 430 (e.g., through a master information block (MIB) payload or a sequence choice). In some cases, this indication to monitor for RMSI 430 on a separate frequency may further indicate to UE 115-*c* that the timing is different from the SSB 420 to the RMSI 430 transmission. In some cases, RMSI 430 may be located in a separate BWP 410, subband (e.g., frequency resource set), or a combination thereof than the SSB 420 that indicates it.

Additionally or alternatively, as noted above in FIG. 3, base station 105-*d* may configure all SSBs to be transmitted according to the floating configuration or the fixed location configuration (e.g., non-floating) irrespective of which BWP 410 the SSB is located in. In some cases, different BWPs 410 may also have different periodicities of SSBs configured. Accordingly, UE 115-*c* may perform rate matching (and determine a TBS) for a PDSCH depending on the SSB configuration for each BWP 410. Base station 105-*d* may signal this configuration via higher layer signaling (e.g., RRC signaling) or with SSB configuration signaling. Additionally, UE 115-*c* may perform RRM and RLM 425 based on the SSBs 420 transmitted in one or each BWP 410.

For RRM, in conventional systems, a center frequency for a serving cell and a neighbor cell may be assumed to be the same to support intra-frequency measurements. Accordingly, UE 115-*c* may perform the intra-frequency measurements without gaps if an SSB 420 is completely within an active BWP 410 for UE 115-*c*. Additionally or alternatively, UE 115-*c* may perform the intra-frequency measurements without gaps if an active BWP 410 is an initial BWP 410 for UE 115-*c* (e.g., BWP 410-*a*). For example, if the active BWP 410-*a* is a first configured BWP 410 for an overall BWP or is a first BWP 410-*a* of the active BWP, UE 115-*c* may perform intra-frequency measurements for RRM assuming that no gaps are present for the measurements. However, when multiple BWPs 410 (or BWPs) are active, the RRM and associated measurements may be affected.

Accordingly, base station 105-*d* may determine a size of measurement window 415 depending on whether an SSB 420 on a frequency raster point (e.g., center frequency) are floating or not (e.g., a floating configuration for a particular active BWP 410). Additionally or alternatively, base station 105-*d* may configure whether UE 115-*c* may assume that SSBs 420 on a given frequency are floating or not. If the SSBs 420 are not floating, UE 115-*c* may use timing from previous measurements to determine where an SSB 420 may occur in this measurement period. In some cases, base station 105-*d* may provide a list of cells that have floating or fixed locations for corresponding SSBs 420 on a given frequency BWP 410 to UE 115-*c*. Accordingly, UE 115-*c* may identify if a detected SSB is floating or fixed based on which cell is transmitting the SSB 420 on the frequency BWP 410 and perform the measurement based on the floating or fixed configuration for that cell.

In some cases, UE 115-*c* may be capable to use measurements simultaneously from multiple BWPs 410. Accordingly, UE 115-*c* may dynamically use these measurements from the multiple BWPs 410. For example, UE 115-*c* may be configured with an ordering of the BWPs 410 (e.g., BWP 410-*a* is first, BWP 410-*b* is second, BWP 410-*c* is third, and BWP 410-*d* is fourth). If the first BWP 410-*a* is not used for transmitting an SSB 420 and a second BWP 410-*b* is used for transmitting SSBs 420, UE 115-*c* may use the second BWP 410-*b* to perform the measurements. Additionally or alternatively, UE 115-*c* may use measurements on all transmitted BWPs 410 to compute cell quality metrics (e.g., the measurements).

In some cases, UE 115-*c* may handle the multiple measurements from the multiple BWPs 410 in different ways. For example, UE 115-*c* may report measurement results observed in each BWP 410 independently with a BWP 410 frequency identification (ID). Additionally or alternatively, UE 115-*c* may combine the measurement results from across all of the BWPs 410 (e.g., sub-channels, subbands, or frequency resource sets). In some cases, when combining the measurement results, UE 115-*c* may be informed whether the SSBs that UE 115-*c* observed on different frequencies belong to a same cell or carrier. Additionally, base station 105-*d* may indicate, to UE 115-*c*, the BWP 410 (e.g., or BWP) frequency map for each neighbor cell, which UE 115-*c* may then use to combine the results accordingly.

For RLM 425, in conventional systems, UE 115-*c* may have one active BWP 410 at any given point of time and may not perform RLM 425 outside of the active downlink BWP 410. Accordingly, for RLM 425, if configured with an RLM reference signal (RLM-RS), UE 115-*c* may monitor the RLM-RS resources to detect a radio link quality of a primary cell (PCell) and a primary secondary cell (PSCell) (e.g., for carrier aggregation). The configured reference signals (e.g., RLM-RSs) may be SSBs 420, channel state information (CSI) reference signals (CSI-RSs), or a combination thereof.

If not configured with RLM-RSs, UE 115-*c* may monitor a reference signal based on a number of available reference signals for an active transmission configuration indication (TCI) state. For example, if a TCI state for the active BWP 410 (e.g., active TCI state) for a physical downlink control channel (PDCCH) repetition includes one reference signal, the UE 115 may monitor that reference signal. In some cases, a TCI state may indicate a quasi co-location (QCL) relationship between a reference signal resource (e.g., a tracking reference signal (TRS), an SSB, a CSI-RS) and a UE target reference signal (e.g., demodulation reference signal (DM-RS)).

Additionally or alternatively, if the TCI state for the active BWP 410 for a PDCCH repetition includes two reference signals, then UE 115-*c* may monitor the reference signal that has a spatial QCL type (e.g., QCL-Type D). Some antenna ports may be referred to as quasi co-located, meaning that the spatial parameters of a transmission on one antenna port may be inferred from the spatial parameters of another transmission on a different antenna port. Accordingly, a receiving device (e.g., a UE 115-*c*) may be able to perform channel estimation for demodulating data or control information received on a first set of antenna ports based on reference signals received on a second set of antenna ports that are quasi co-located with the first set of antenna ports.

In some cases, UE 115-*c* may not perform RLM 425 or monitor for reference signals if the reference signals are transmitted aperiodically or semi-persistently. Additionally, the number of reference signals that may be configured for UE 115-*c* to monitor for RLM may be limited. For example, for a first frequency range (FR1) and a frequency is below a threshold value (e.g., below three (3) GHz), the number of RLM-RSs may be two (2). Additionally or alternatively, for FR1 and a frequency in a window of FR1 (e.g., between three (3) and six (6) GHz), the number of RLM-RSs may be four (4). Alternatively, for a second frequency range (FR2), the number of RLM-RSs may be eight (8). However, when multiple BWPs 410 are active, UE 115-*c* may not know which of the active BWPs 410 to monitor for RLM 425.

Accordingly, when multiple BWPs 410 are active, UE 115-*c* may be configured to perform RLM 425 in one chosen BWP 410 (e.g., called a primary BWP 410 or subband). Additionally or alternatively, UE 115-*c* may be configured to perform RLM 425 in more than one BWP 410. When performing RLM 425 in more than one BWP 410, UE 115-*c* may be considered to be in-sync if at least one of the reference signals monitored (e.g., RLM-RSs) meets a radio link quality threshold value for determining synchronization (e.g., $Q_{in}$ criteria). Alternatively, UE 115-*c* may be considered to be out-of-sync if all of the reference signals monitored meet a radio link quality threshold for being out-of-sync (e.g., $Q_{out}$ criteria). If a BWP 410 has no reference signal configured, then the TCI state for the active BWP 410 used for a PDCCH repetition may be used to determine a link quality for the BWP 410. In some cases, if cross sub-band scheduling is allowed and the BWP 410 does not have a PDCCH configured as well, then a PDSCH-based RLM 425 may be used. For an unlicensed spectrum, due to interference from other cells, an RLM quality may be significantly different on each subband, and, hence, UE 115-*c* may monitor multiple or all of the BWPs 410 at the same time.

Additionally, UE 115-*c* may be configured to monitor each active BWP 410 based on a TDM pattern. For example, if UE 115-*c* has a constraint on the number of reference signals UE 115-*c* can monitor or if UE 115-*c* can perform RLM 425 on one BWP 410 at a time, a TDM pattern may be defined for performing RLM 425 across the different BWPs 410. In some cases, UE 115-*c* may also report a link quality on each individual active BWP 410 to base station 105-*d*. Base station 105-*d* may then choose to activate or deactivate a BWP 410 based on the individual link qualities. Additionally, base station 105-*d* may combine the result of each BWP 410 link quality measurement to derive an overall cell quality for UE 115-*c*.

Figure 5:
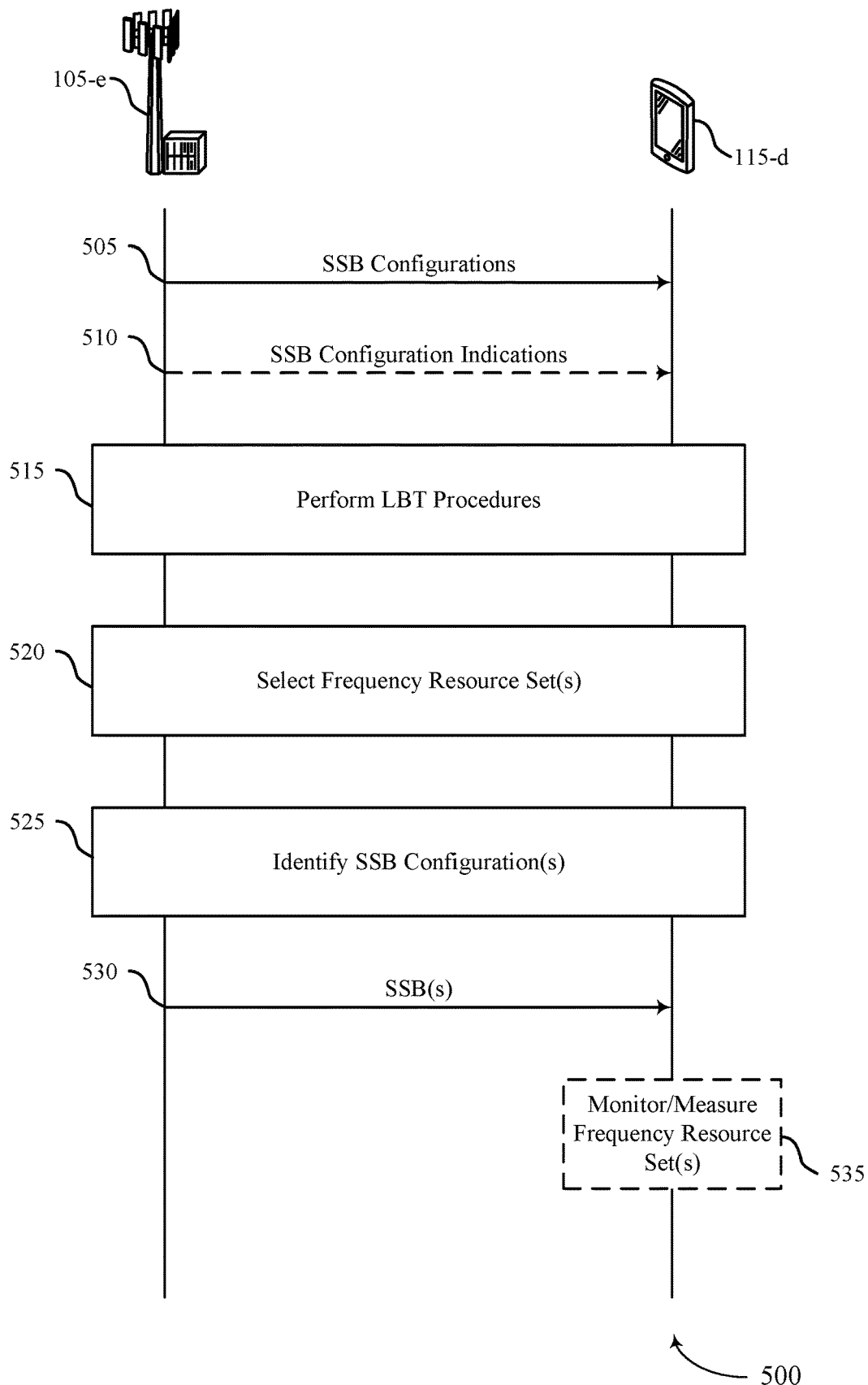
FIGS. 5 and 6 illustrate examples of process flows that support multiple BWP measurements in accordance with aspects of the present disclosure.

FIG. 5 illustrates an example of a process flow 500 that supports multiple BWP measurements in accordance with aspects of the present disclosure. In some examples, process flow 500 may implement aspects of wireless communications systems 100 and/or 200. Process flow 500 may include a base station 105-*e* and a UE 115-*d*, which may be examples of corresponding base stations 105 and UEs 115, respectively, as described above with reference to FIGS. 1-4.

In the following description of the process flow 500, the operations between UE 115-*d* and base station 105-*e* may be performed in different orders or at different times. Certain operations may also be left out of the process flow 500, or other operations may be added to the process flow 500. It is to be understood that while UE 115-*d* and base station 105-*e* are shown performing a number of the operations of process flow 500, any wireless device may perform the operations shown.

At 505, UE 115-*d* may receive, from base station 105-*e*, a set of SSB configurations for a set of frequency resource sets (e.g., BWPs, subbands, sub-channels) configured for communications in a shared radio frequency spectrum band. In some cases, each of the set of SSB configurations may correspond to at least one of the set of frequency resource sets. Additionally, at least a first of the set of SSB configurations may indicate an SSB configuration that floats relative to a measurement time configuration window, and at least a second of the set of SSB configurations indicates an SSB configuration that is fixed relative to the measurement time configuration window. Base station 105-*e* may transmit the SSB configuration via RRC signaling, system information block (SIB) signaling, or a combination thereof. In some cases, a first SSB configuration of the set of SSB configurations may indicate a first SSB periodicity, and a second SSB configuration of the set of SSB configurations may indicate a second SSB periodicity different from the first SSB periodicity.

At 510, base station 105-*e* may transmit, to UE 115-*d*, one or more indications for the set of SSB configurations. For example, base station 105-*e* may transmit an indication that a transmitted SSB is fixed relative to a measurement time window. Additionally or alternatively, base station 105-*e* may transmit, to UE 115-*d*, an identification of one or more of the frequency resource sets of the set of frequency resource sets that UE 115-*d* is to assume float relative to a measurement time configuration window or an identification of one or more of the frequency resource sets of the set of frequency resource sets that UE 115-*d* is to assume is fixed relative to a measurement time configuration window. In some cases, base station 105-*e* may transmit, to UE 115-*d* and for each of the set of frequency resource sets, an indication of whether base station 105-*e* will transmit SSBs in the frequency resource set according to a timing that is fixed or floating relative to a measurement time configuration window.

At 515, base station 105-*e* and/or UE 115-*d* may perform an LBT procedure for the set of frequency resource sets. In some cases, base station 105-*e* and/or UE 115-*d* may perform the LBT procedure separately for each set of frequency resource sets.

At 520, base station 105-*e* and/or UE 115-*d* may select, based on a result of the performed LBT procedure, a frequency resource set of the set of frequency resource sets. In some cases, base station 105-*e* and/or UE 115-*d* may select, based on a result of the performed LBT procedure, at least one additional frequency resource set of the set of frequency resource sets.

At 525, base station 105-*e* and/or UE 115-*d* may identify an SSB configuration of the set of SSB configurations that corresponds to the selected frequency resource set. In some cases, base station 105-*e*, UE 115-*d*, or a combination thereof may identify at least one additional SSB configuration of the set of SSB configurations that correspond to the selected at least one additional frequency resource set. Additionally, UE 115-*d* may perform, based on the identified SSB configuration, rate matching on a first data channel of the selected frequency resource set and on at least one additional data channel of the at least one selected frequency resource set.

At 530, UE 115-*d* may receive, from base station 105-*e* on the selected frequency resource set, an SSB according to the identified SSB configuration. In some cases, UE 115-*d* may receive, from base station 105-*e*, more than one SSB according to the identified SSB configuration, the identified at least one additional SSB configuration, or a combination thereof.

At 535, UE 115-*d* may monitor, or measure, or a combination thereof different characteristics of each selected frequency resource set. For example, UE 115-*d* may monitor, based on receiving an indication that the received SSB is fixed relative to a measurement time window, a second frequency resource set of the set of frequency resource sets for system information. UE 115-*d* may receive the indication in an MIB of a received SSB or as a predetermined sequence of the received SSB. In some cases, UE 115-*d* may identify, for at least one of the one or more of the frequency resource sets that are fixed in response to the received identification, timing information associated with SSBs in a previous measurement time configuration window and may determine timing information for SSBs of a current measurement time configuration window based on the timing information associated with the SSBs of the previous measurement time configuration window.

Additionally or alternatively, UE 115-*d* may receive, from base station 105-*e*, an indication of an order of priority for the set of frequency resource sets, where a first frequency resource set of the set of frequency resource sets may have a higher priority than a second frequency resource set of the set of frequency resource sets. Accordingly, UE 115-*d* may identify that the first frequency resource set is not to be transmitted by base station 105-*e* during a measurement time configuration window and may monitor, based on identifying that the first frequency resource set is not to be transmitted, for one or more SSBs in the second frequency resource set during the measurement time configuration window.

In some cases, UE 115-*d* may receive at least one additional SSB in at least one additional frequency resource set as described above. As such, UE 115-*d* may determine one or more values of a channel quality metric based on the received SSB and the at least one additional SSB. Subsequently, UE 115-*d* may transmit, to base station 105-*e*, a report that separately indicates values of the channel quality metric for the selected frequency resource set and the at least one additional frequency resource set. In some cases, UE 115-*d* may combine values of the channel quality metric for the selected frequency resource set and the at least one additional frequency resource set to generate a combined metric. Accordingly, UE 115-*d* may transmit, to base station 105-*e*, a report indicating the combined metric.

Figure 6:
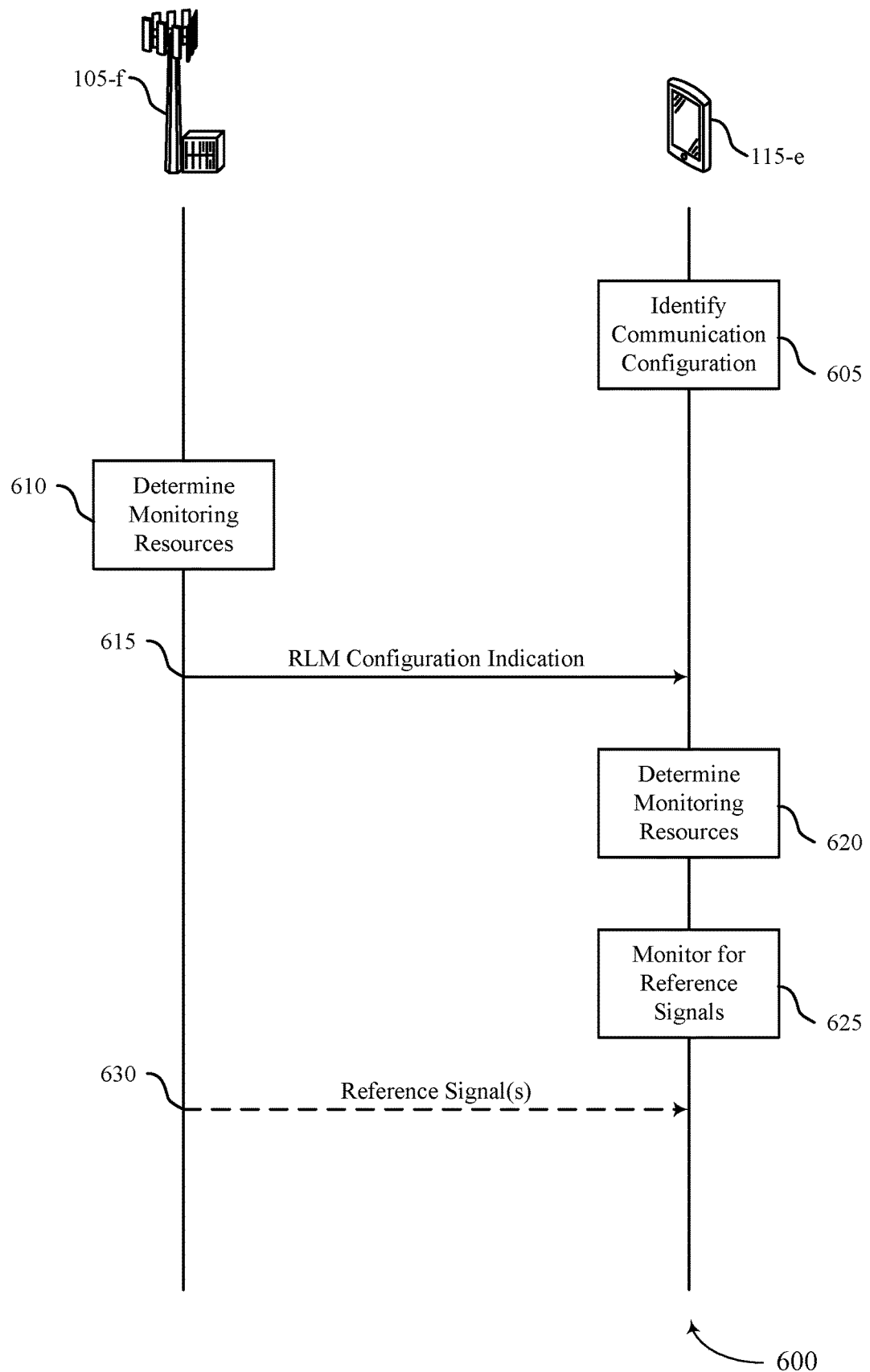

FIG. 6 illustrates an example of a process flow 600 that supports multiple BWP measurements in accordance with aspects of the present disclosure. In some examples, process flow 600 may implement aspects of wireless communications systems 100 and/or 200. Process flow 600 may include a base station 105-*f* and a UE 115-*e*, which may be examples of corresponding base stations 105 and UEs 115, respectively, as described above with reference to FIGS. 1-5.

In the following description of the process flow 600, the operations between UE 115-*e* and base station 105-*f* may be performed in different orders or at different times. Certain operations may also be left out of the process flow 600, or other operations may be added to the process flow 600. It is to be understood that while UE 115-*e* and base station 105-*f* are shown performing a number of the operations of process flow 600, any wireless device may perform the operations shown.

At 605, UE 115-*e* may identify that UE 115-*e* is configured to use a set of frequency resource sets (e.g., BWPs, subbands, sub-channels) of a component carrier to communicate in a shared radio frequency spectrum band. In some cases, the shared radio frequency spectrum band may include an unlicensed radio frequency spectrum band, or a shared licensed radio frequency spectrum band, or a combination thereof.

At 610, base station 105-*f* may determine, for UE 115-*e* configured to use the set of frequency resource sets of a component carrier to communicate in a shared radio frequency spectrum band with the base stations, a set of time and frequency resources for UE 115-*e* to monitor for reference signals for at least one frequency resource set of the set of frequency resource sets. In some cases, base station 105-*f* may determine the set of time and frequency resources of a single frequency resource set of the set of frequency resource sets to monitor for reference signals, the received indication identifying that one frequency resource set is to be monitored. Additionally or alternatively, base station 105-*f* may determine the set of time and frequency resources of the set of frequency resource sets to monitor for reference signals, the received indication identifying that multiple frequency resource sets are to be monitored. In some cases, base station 105-*f* may determine, based on the received indication of the RLM configuration, a TDM pattern of time and frequency resources of the set of frequency resource sets to be monitored for reference signals, the set of time and frequency resources including at least one set of time and frequency resources in each of the set of frequency resource sets.

At 615, UE 115-*e* may receive, from base station 105-*f*, an indication of an RLM configuration for the set of frequency resource sets. In some cases, the received indication may identify the at least one frequency resource set of the set of frequency resource sets to be monitored by UE 115-*e*.

At 620, UE 115-*e* may determine, based on the received indication, a set of time and frequency resources to monitor for reference signals for at least one frequency resource set of the set of frequency resource sets. In some cases, UE 115-*e* may determine the set of time and frequency resources of a single frequency resource set of the set of frequency resource sets to monitor for reference signals, the received indication identifying that one frequency resource set is to be monitored. Additionally or alternatively, UE 115-*e* may determine the set of time and frequency resources of the set of frequency resource sets to monitor for reference signals, the received indication identifying that multiple frequency resource sets are to be monitored. In some cases, UE 115-*e* may determine, based on the received indication of the RLM configuration, a TDM pattern of time and frequency resources of the set of frequency resource sets to be monitored for reference signals, the set of time and frequency resources including at least one set of time and frequency resources in each of the set of frequency resource sets.

At 625, UE 115-*e* may monitor the at least one frequency resource set for reference signals according to the determined set of time and frequency resources.

At 630, UE 115-*e* may receive, from base station 105-*f* one or more reference signals on the at least one frequency resource set. In some cases, UE 115-e may determine, based on the received one or more reference signals, a link quality value for the at least one frequency resource set and may identify whether UE 115-e is synchronized based on the determined link quality values. For example, UE 115-e may identify that UE 115-e is synchronized based on determining that at least one of the determined link quality values satisfies a link quality threshold. Alternatively, UE 115-e may identify that UE 115-e is not synchronized based on determining that all of determined link quality values fail to satisfy the link quality threshold.

In some cases, UE 115-e may identify a frequency resource set of the set of frequency resource sets that lacks a configuration for reference signal monitoring and may determine a link quality for the identified frequency resource set based on a TCI state for the identified frequency resource set. Additionally or alternatively, UE 115-e may determine a link quality associated with each of the at least one frequency resource set and may transmit a report, to base station 105-f, of the determine link quality. In some cases, UE 115-e may receive, from base station 105-f in response to the transmitted report, a command for UE 115-e to deactivate one or more of the set of frequency resource sets.

Figure 7:
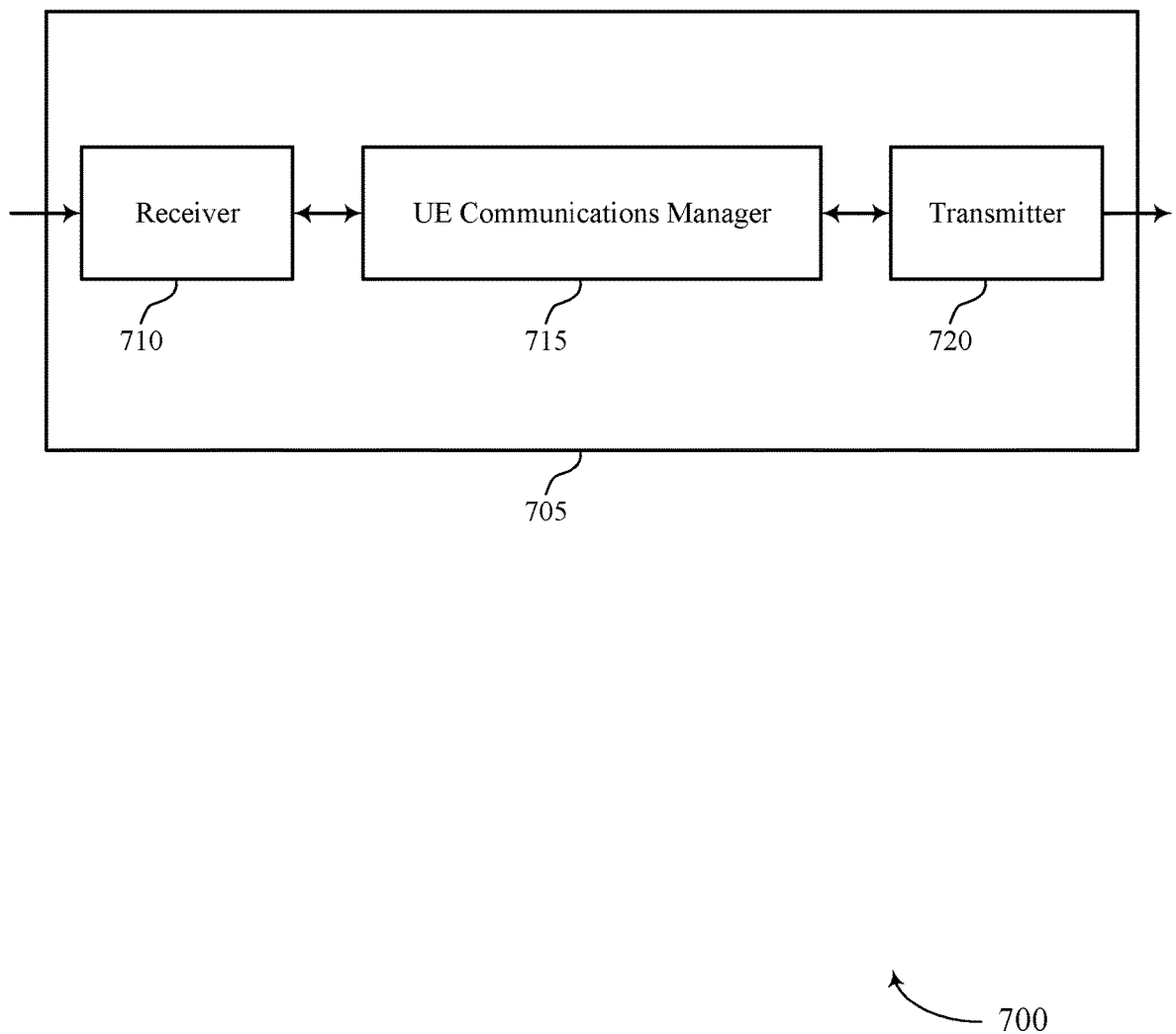
FIGS. 7 and 8 show block diagrams of devices that support multiple BWP measurements in accordance with aspects of the present disclosure.

FIG. 7 shows a block diagram 700 of a device 705 that supports multiple BWP measurements in accordance with aspects of the present disclosure. The device 705 may be an example of aspects of a UE 115 as described herein. The device 705 may include a receiver 710, a UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to multiple BWP measurements). Information may be passed on to other components of the device 705. The receiver 710 may be an example of aspects of the transceiver 1020 described with reference to FIG. 10. The receiver 710 may utilize a single antenna or a set of antennas.

The UE communications manager 715 may receive a set of SSB configurations for a set of frequency resource sets configured for communications in a shared radio frequency spectrum band. In some cases, the UE communications manager 715 may perform an LBT procedure for the set of frequency resource sets. Accordingly, the UE communications manager 715 may select, based on a result of the performed LBT procedure, a frequency resource set of the set of frequency resource sets. Additionally, the UE communications manager 715 may identify an SSB configuration of the set of SSB configurations that corresponds to the selected frequency resource set. In some cases, the UE communications manager 715 may receive, on the selected frequency resource set, an SSB according to the identified SSB configuration.

Additionally or alternatively, the UE communications manager 715 may identify that the UE is configured to use a set of frequency resource sets of a component carrier to communicate in a shared radio frequency spectrum band. In some cases, the UE communications manager 715 may receive an indication of an RLM configuration for the set of frequency resource sets. Accordingly, the UE communications manager 715 may determine, based on the received indication, a set of time and frequency resources to monitor for reference signals for at least one frequency resource set of the set of frequency resource sets. Additionally, the UE communications manager 715 may monitor the at least one frequency resource set for reference signals according to the determined set of time and frequency resources. The UE communications manager 715 may be an example of aspects of the UE communications manager 1010 described herein.

The UE communications manager 715, or its sub-components, may be implemented in hardware, code (e.g., software or firmware) executed by a processor, or any combination thereof. If implemented in code executed by a processor, the functions of the UE communications manager 715, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The UE communications manager 715, or its sub-components, may be physically located at various positions, including being distributed such that portions of functions are implemented at different physical locations by one or more physical components. In some examples, the UE communications manager 715, or its sub-components, may be a separate and distinct component in accordance with various aspects of the present disclosure. In some examples, the UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

The UE communications manager 715 as described herein may be implemented to realize one or more potential advantages. One implementation may allow the device 705 to more efficiently coordinate LBT procedure between a base station and the device 705, and more specifically to coordinate LBT, RLM, and RRM procedures (or one or more of LBT, RLM, and RRM procedures) between device 705 and one or more base stations when multiple BWPs are used.

Based on implementing the LBT, RLM, and RRM techniques as described herein, a processor of a UE 115 (e.g., controlling the receiver 710, the transmitter 720, or the transceiver 1020 as described with reference to FIG. 10) may increase efficiency of LBT, RLM, and RRM procedure when one or more BWPs or subbands are being used.

Figure 8:
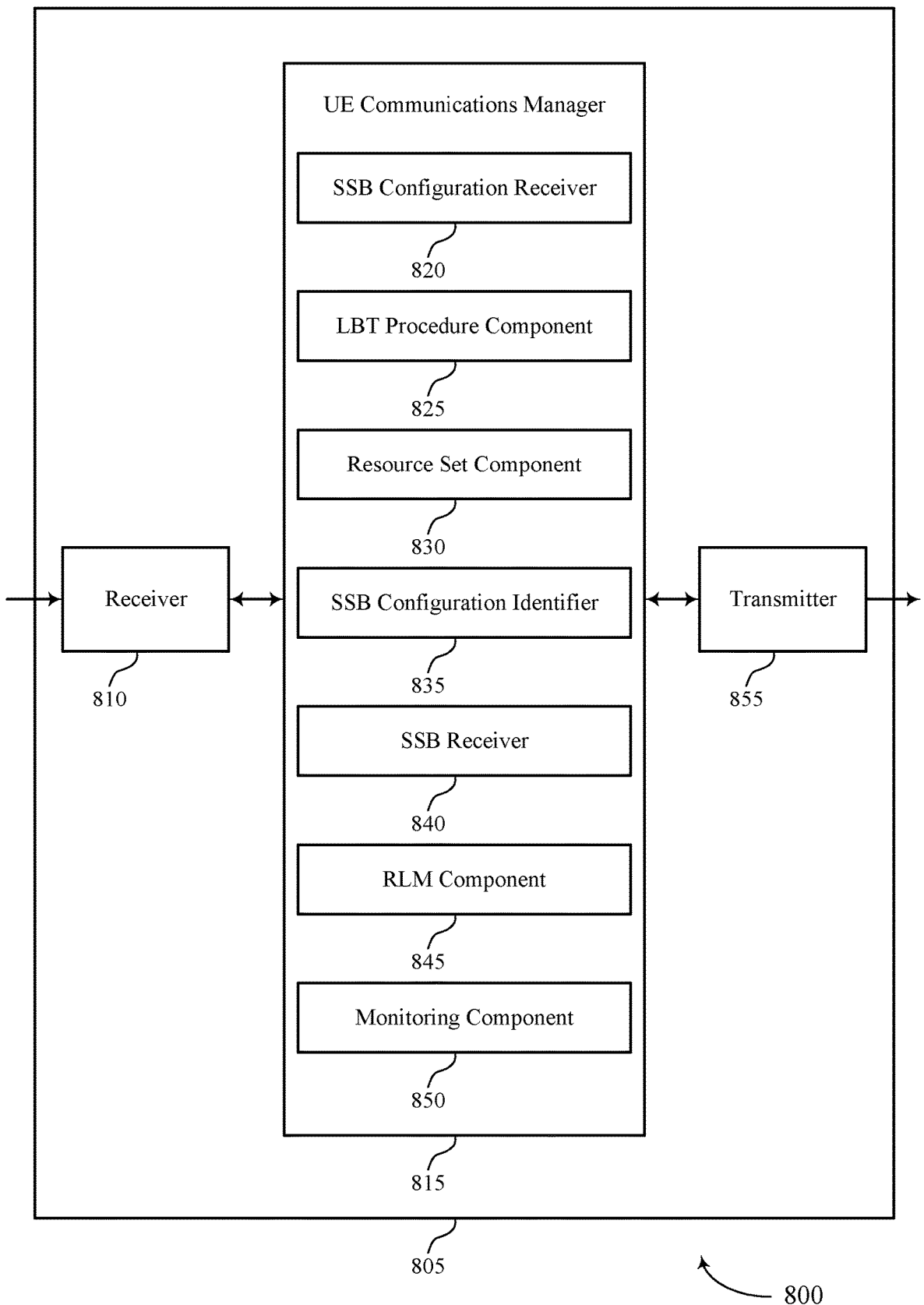

FIG. 8 shows a block diagram 800 of a device 805 that supports multiple BWP measurements in accordance with aspects of the present disclosure. The device 805 may be an example of aspects of a device 705, or a UE 115 as described herein. The device 805 may include a receiver 810, a UE communications manager 815, and a transmitter 855. The device 805 may also include a processor. Each of these components may be in communication with one another (e.g., via one or more buses).

The receiver 810 may receive information such as packets, user data, or control information associated with various information channels (e.g., control channels, data channels, and information related to multiple BWP measurements). Information may be passed on to other components of the device 805. The receiver 810 may be an example of aspects of the transceiver 1020 described with reference to FIG. 10. The receiver 810 may utilize a single antenna or a set of antennas.

The UE communications manager 815 may be an example of aspects of the UE communications manager 715 as described herein. The UE communications manager 815 may include an SSB configuration receiver 820, an LBT procedure component 825, a resource set component 830, an SSB configuration identifier 835, an SSB receiver 840, an RLM component 845, and a monitoring component 850. The UE communications manager 815 may be an example of aspects of the UE communications manager 1010 described herein.

The SSB configuration receiver 820 may receive a set of SSB configurations for a set of frequency resource sets configured for communications in a shared radio frequency spectrum band. The LBT procedure component 825 may perform an LBT procedure for the set of frequency resource sets. The resource set component 830 may select, based on a result of the performed LBT procedure, a frequency resource set of the set of frequency resource sets. The resource set component 830 may identify that the UE is configured to use a set of frequency resource sets of a component carrier to communicate in a shared radio frequency spectrum band.

The SSB configuration identifier 835 may identify an SSB configuration of the set of SSB configurations that corresponds to the selected frequency resource set. The SSB receiver 840 may receive, on the selected frequency resource set, an SSB according to the identified SSB configuration. The RLM component 845 may receive an indication of an RLM configuration for the set of frequency resource sets.

The monitoring component 850 may determine, based on the received indication, a set of time and frequency resources to monitor for reference signals for at least one frequency resource set of the set of frequency resource sets and monitor the at least one frequency resource set for reference signals according to the determined set of time and frequency resources.

The transmitter 855 may transmit signals generated by other components of the device 805. In some examples, the transmitter 855 may be collocated with a receiver 810 in a transceiver module. For example, the transmitter 855 may be an example of aspects of the transceiver 1020 described with reference to FIG. 10. The transmitter 855 may utilize a single antenna or a set of antennas.

Figure 9:
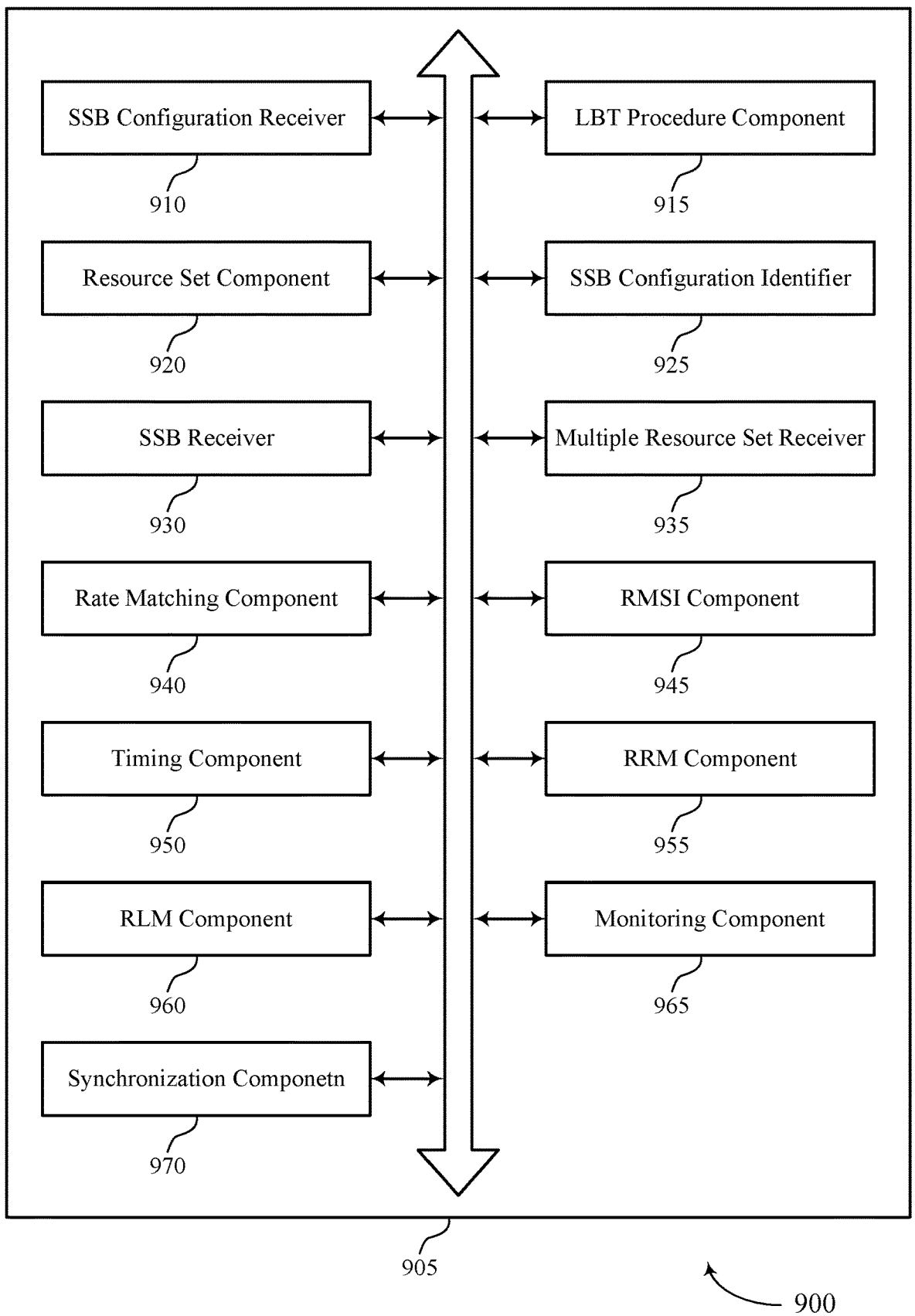
FIG. 9 shows a block diagram of a UE communications manager that supports multiple BWP measurements in accordance with aspects of the present disclosure.

FIG. 9 shows a block diagram 900 of a UE communications manager 905 that supports multiple BWP measurements in accordance with aspects of the present disclosure. The UE communications manager 905 may be an example of aspects of a UE communications manager 715, a UE communications manager 815, or a UE communications manager 1010 described herein. The UE communications manager 905 may include an SSB configuration receiver 910, an LBT procedure component 915, a resource set component 920, an SSB configuration identifier 925, an SSB receiver 930, a multiple resource set receiver 935, a rate matching component 940, an RMSI component 945, a timing component 950, an RRM component 955, an RLM component 960, a monitoring component 965, and a synchronization component 970. Each of these modules may communicate, directly or indirectly, with one another (e.g., via one or more buses).

The SSB configuration receiver 910 may receive a set of SSB configurations for a set of frequency resource sets configured for communications in a shared radio frequency spectrum band. In some examples, the set of frequency resource sets includes a set of BWPs, or a set of sub-bands, or a combination thereof. In some examples, the set of frequency resource sets includes a set of BWPs, and the at least one frequency resource set includes at least one of the set of BWPs. In some examples, the SSB configuration receiver 910 may receive radio resource control signaling, or system information block signaling, or a combination thereof, that indicates the set of SSB configurations. In some cases, each of the set SSB configurations correspond to at least one of the set of frequency resource sets. In some cases, at least a first of the set of SSB configurations indicates an SSB configuration that floats relative to a measurement time configuration window, and at least a second of the set of SSB configurations indicates an SSB configuration that is fixed relative to the measurement time configuration window. In some cases, a first SSB configuration of the set of SSB configurations indicates a first SSB periodicity, and a second SSB configuration of the set of SSB configurations indicates a second SSB periodicity different from the first SSB periodicity.

The LBT procedure component 915 may perform an LBT procedure for the set of frequency resource sets. In some examples, the LBT procedure component 915 may perform the LBT procedure separately for each of the set of frequency resource sets.

The resource set component 920 may select, based on a result of the performed LBT procedure, a frequency resource set of the set of frequency resource sets. In some examples, the resource set component 920 may identify that the UE is configured to use a set of frequency resource sets of a component carrier to communicate in a shared radio frequency spectrum band. In some examples, the selected frequency resource set includes one of the set of BWPs, or the set of sub-bands, or the combination thereof. In some examples, the set of frequency resource sets includes a set of BWPs, or a set of sub-bands, or a combination thereof. In some examples, the set of frequency resource sets includes a set of BWPs, and the at least one frequency resource set includes at least one of the set of BWPS. In some cases, the set of frequency resource sets includes a set of sub-bands, and the at least one frequency resource set includes at least one of the set of sub-bands. In some cases, the shared radio frequency spectrum band includes an unlicensed radio frequency spectrum band, or a shared licensed radio frequency spectrum band, or a combination thereof.

The SSB configuration identifier 925 may identify an SSB configuration of the set of SSB configurations that corresponds to the selected frequency resource set. In some examples, the SSB configuration identifier 925 may receive an identification of one or more of the frequency resource sets of the set of frequency resource sets that the UE is to assume float relative to a measurement time configuration window. In some examples, the SSB configuration identifier 925 may receive, from a base station and for each of the set of frequency resource sets, an indication of whether the base station will transmit SSBs in the frequency resource set according to a timing that is fixed or floating relative to a measurement time configuration window.

The SSB receiver 930 may receive, on the selected frequency resource set, an SSB according to the identified SSB configuration.

The RLM component 960 may receive an indication of an RLM configuration for the set of frequency resource sets. In some examples, the RLM component 960 may identify a frequency resource set of the set of frequency resource sets that lacks a configuration for reference signal monitoring. In some examples, the RLM component 960 may determine a link quality for the identified frequency resource set based on a transmission configuration state for the identified frequency resource set. In some examples, the RLM component 960 may determine a link quality associated with each of the at least one frequency resource set. In some examples, the RLM component 960 may transmit a report of the determined link quality. In some examples, the RLM component 960 may receive, in response to the transmitted report, a command for the UE to deactivate one or more of the set of frequency resource sets. In some cases, the received indication identifies the at least one frequency resource set of the set of frequency resource sets to be monitored by the UE.

The monitoring component 965 may determine, based on the received indication, a set of time and frequency resources to monitor for reference signals for at least one frequency resource set of the set of frequency resource sets. In some examples, the monitoring component 965 may monitor the at least one frequency resource set for reference signals according to the determined set of time and frequency resources. In some examples, the at least one frequency resource set includes one of at least one of the set of BWPs, or at least one of the set of sub-bands, or the combination thereof. In some examples, the monitoring component 965 may determine the set of time and frequency resources of a single frequency resource set of the set of frequency resource sets to monitor for reference signals, the received indication identifying that one frequency resource set is to be monitored.

In some examples, the monitoring component 965 may determine the set of time and frequency resources of the set of frequency resource sets to monitor for reference signals, the received indication identifying that multiple frequency resource sets are to be monitored. In some examples, the monitoring component 965 may determine, based on the received indication of the RLM configuration, a TDM pattern of time and frequency resources of the set of frequency resource sets to be monitored for reference signals, the set of time and frequency resources including at least one set of time and frequency resources in each of the set of frequency resource sets.

The multiple resource set receiver 935 may select, based on a result of the performed LBT procedure, at least one additional frequency resource set of the set of frequency resource sets. In some examples, the multiple resource set receiver 935 may identify at least one additional SSB configuration of the set of SSB configurations that correspond to the selected at least one additional frequency resource set. In some examples, the multiple resource set receiver 935 may receive a set of SSBs according to the identified SSB configuration, or the identified at least one additional SSB configuration, or a combination thereof.

The rate matching component 940 may perform, based on the identified SSB configuration, rate matching on a first data channel of the selected frequency resource set. In some examples, the rate matching component 940 may perform, based on the identified at least one SSB configuration, rate matching on at least one additional data channel of the at least one selected frequency resource set.

The RMSI component 945 may receive an indication that the received SSB is fixed relative to a measurement time window. In some examples, the RMSI component 945 may monitor, based on the received indication, a second frequency resource set of the set of frequency resource sets for system information. In some examples, the RMSI component 945 may receive the indication in a master information block of the received SSB or may receive the indication as a predetermined sequence of the received SSB.

The timing component 950 may receive an identification of one or more of the frequency resource sets of the set of frequency resource sets that the UE is to assume are fixed relative to a measurement time configuration window. In some examples, the timing component 950 may identify, for at least one of the one or more of the frequency resource sets in response to the received identification, timing information associated with SSBs in a previous measurement time configuration window. In some examples, the timing component 950 may determine timing information for SSBs of a current measurement time configuration window based on the timing information associated with the SSBs of the previous measurement time configuration window.

The RRM component 955 may receive, from a base station, an indication of an order of priority for the set of frequency resource sets, a first frequency resource set of the set of frequency resource sets having a higher priority than a second frequency resource set of the set of frequency resource sets. In some examples, the RRM component 955 may identify that the first frequency resource set is not to be transmitted by the base station during a measurement time configuration window. In some examples, the RRM component 955 may monitor, based on the identifying that the first frequency resource set is not to be transmitted, for one or more SSBs in the second frequency resource set during the measurement time configuration window. In some examples, the RRM component 955 may receive at least one additional SSB in at least one additional frequency resource set.

In some examples, the RRM component 955 may determine one or more values of a channel quality metric based on the received SSB and the at least one additional SSB. In some examples, the RRM component 955 may transmit, to a base station, a report that separately indicates values of the channel quality metric for the selected frequency resource set and the at least one additional frequency resource set. In some examples, the RRM component 955 may combine values of the channel quality metric for the selected frequency resource set and the at least one additional frequency resource set to generate a combined metric. In some examples, the RRM component 955 may transmit, to a base station, a report indicating the combined metric.

The synchronization component 970 may receive one or more reference signals on a set of frequency resource sets of the at least one frequency resource set. In some examples, the synchronization component 970 may determine, based on the received one or more reference signals, a link quality value for each of the set of frequency resource sets. In some cases, the reference signal include SSBs. In some examples, the synchronization component 970 may identify whether the UE is synchronized based on the determined link quality values. In some examples, the synchronization component 970 may identify that the UE is synchronized based on determining that each of the set of determined link quality values satisfy a link quality threshold. In some examples, the synchronization component 970 may identify that the UE is not synchronized based on determining that all of the set of determined link quality values fail to satisfy the link quality threshold.

Figure 10:
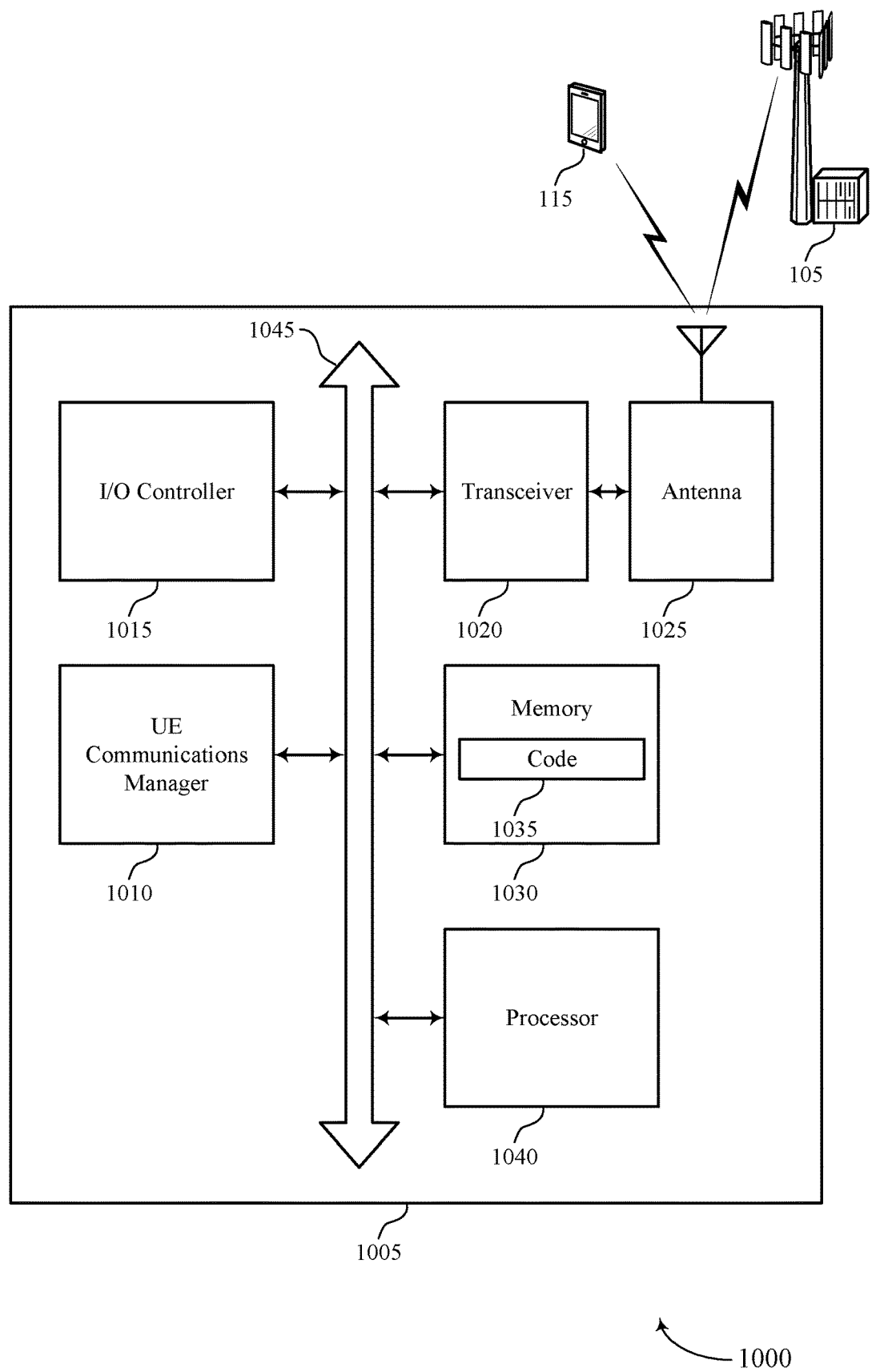
FIG. 10 shows a diagram of a system including a device that supports multiple BWP measurements in accordance with aspects of the present disclosure.

FIG. 10 shows a diagram of a system 1000 including a device 1005 that supports multiple BWP measurements in accordance with aspects of the present disclosure. The device 1005 may be an example of or include the components of device 705, device 805, or a UE 115 as described herein. The device 1005 may include components for bi-directional voice and data communications including components for transmitting and receiving communications, including a UE communications manager 1010, an I/O controller 1015, a transceiver 1020, an antenna 1025, memory 1030, and a processor 1040. These components may be in electronic communication via one or more buses (e.g., bus 1045).

The UE communications manager 1010 may receive a set of SSB configurations for a set of frequency resource sets configured for communications in a shared radio frequency spectrum band. In some cases, the UE communications manager 1010 may perform an LBT procedure for the set of frequency resource sets. Accordingly, the UE communications manager 1010 may select, based on a result of the performed LBT procedure, a frequency resource set of the set of frequency resource sets. Additionally, the UE communications manager 1010 may identify an SSB configuration of the set of SSB configurations that corresponds to the selected frequency resource set. In some cases, the UE communications manager 1010 may receive, on the selected frequency resource set, an SSB according to the identified SSB configuration.

Additionally or alternatively, the UE communications manager 1010 may identify that the UE is configured to use a set of frequency resource sets of a component carrier to communicate in a shared radio frequency spectrum band. In some cases, the UE communications manager 1010 may receive an indication of an RLM configuration for the set of frequency resource sets. Accordingly, the UE communications manager 1010 may determine, based on the received indication, a set of time and frequency resources to monitor for reference signals for at least one frequency resource set of the set of frequency resource sets. In some cases, the UE communications manager 1010 may monitor the at least one frequency resource set for reference signals according to the determined set of time and frequency resources. In some cases, the reference signals include SSBs.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting multiple BWP measurements).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
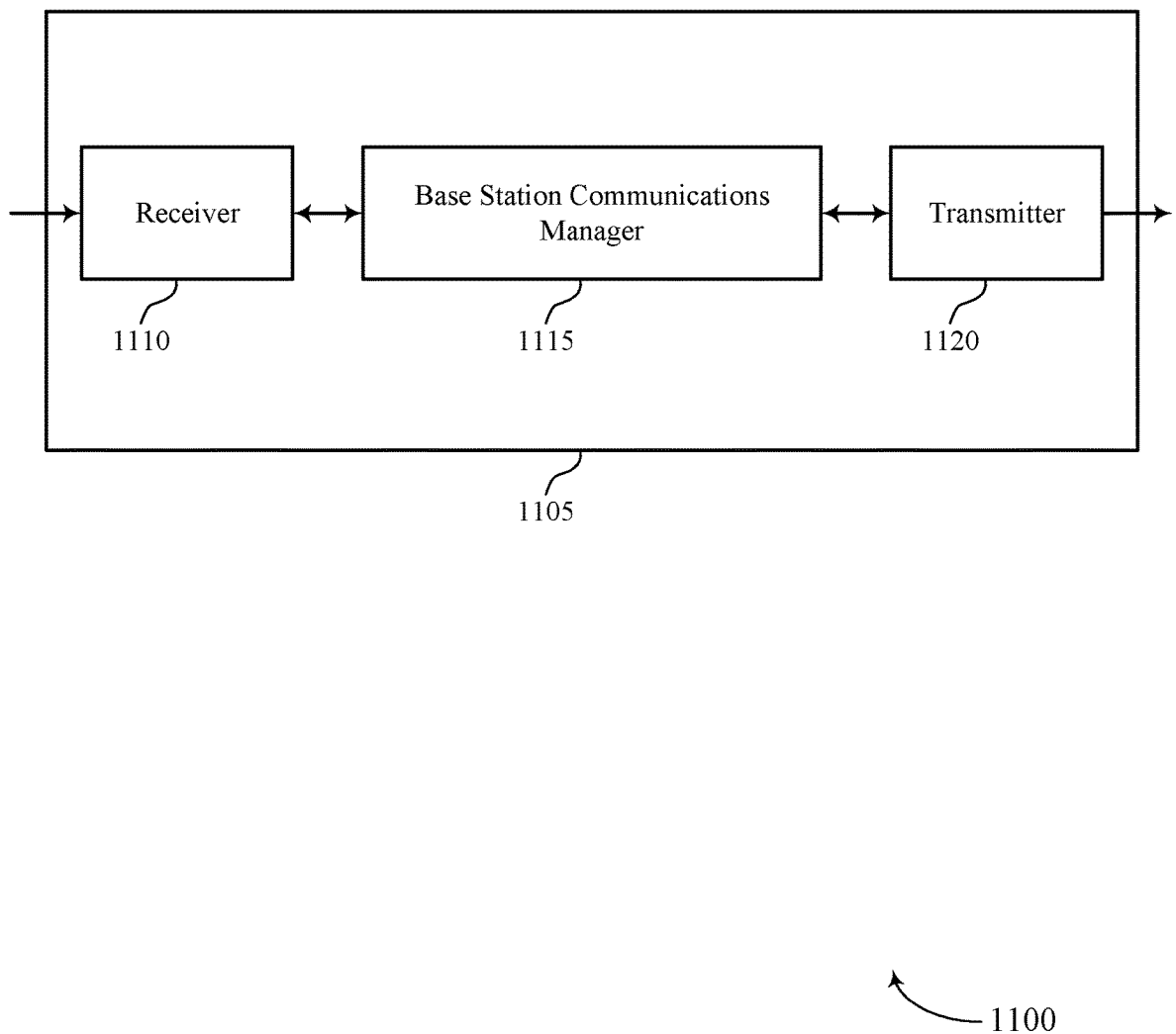
FIGS. 11 and 12 show block diagrams of devices that support multiple BWP measurements in accordance with aspects of the present disclosure.

FIG. 11 shows a block diagram 1100 of a device 1105 that supports multiple BWP measurements in accordance with aspects of the present disclosure. The device 1105 may be an example of aspects of a base station 105 as described herein. The device 1105 may include a receiver 1110, a base station communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to multiple BWP measurements). Information may be passed on to other components of the device 1105. The receiver 1110 may be an example of aspects of the transceiver 1420 described with reference to FIG. 14. The receiver 1110 may utilize a single antenna or a set of antennas.

The base station communications manager 1115 may transmit, to a UE, a set of SSB configurations for a set of frequency resource sets configured for communications in a shared radio frequency spectrum band. In some cases, the base station communications manager 1115 may perform an LBT procedure for the set of frequency resource sets. Accordingly, the base station communications manager 1115 may select, based on a result of the performed LBT procedure, a frequency resource set of the set of frequency resource sets. Additionally, the base station communications manager 1115 may identify an SSB configuration of the set of SSB configurations that corresponds to the selected frequency resource set. In some cases, the base station communications manager 1115 may transmit, on the selected frequency resource set, an SSB according to the identified SSB configuration.

Additionally or alternatively, the base station communications manager 1115 may determine, for a UE configured to use a set of frequency resource sets of a component carrier to communicate in a shared radio frequency spectrum band with the base stations, a set of time and frequency resources for the UE to monitor for reference signals for at least one frequency resource set of the set of frequency resource sets. In some cases, the base station communications manager 1115 may transmit, to the UE, an indication of an RLM configuration for the set of frequency resource sets that indicates the determined set of time and frequency resources. The base station communications manager 1115 may be an example of aspects of the base station communications manager 1410 described herein.

The base station communications manager 1115, or its sub-components, may be implemented in hardware, code (e.g., software or firmware) executed by a processor, or any combination thereof. If implemented in code executed by a processor, the functions of the base station communications manager 1115, or its sub-components may be executed by a general-purpose processor, a DSP, an ASIC, a FPGA or other PLD, discrete gate or transistor logic, discrete hardware components, or any combination thereof designed to perform the functions described in the present disclosure.

The base station communications manager 1115, or its sub-components, may be physically located at various positions, including being distributed such that portions of functions are implemented at different physical locations by one or more physical components. In some examples, the base station communications manager 1115, or its sub-components, may be a separate and distinct component in accordance with various aspects of the present disclosure. In some examples, the base station communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
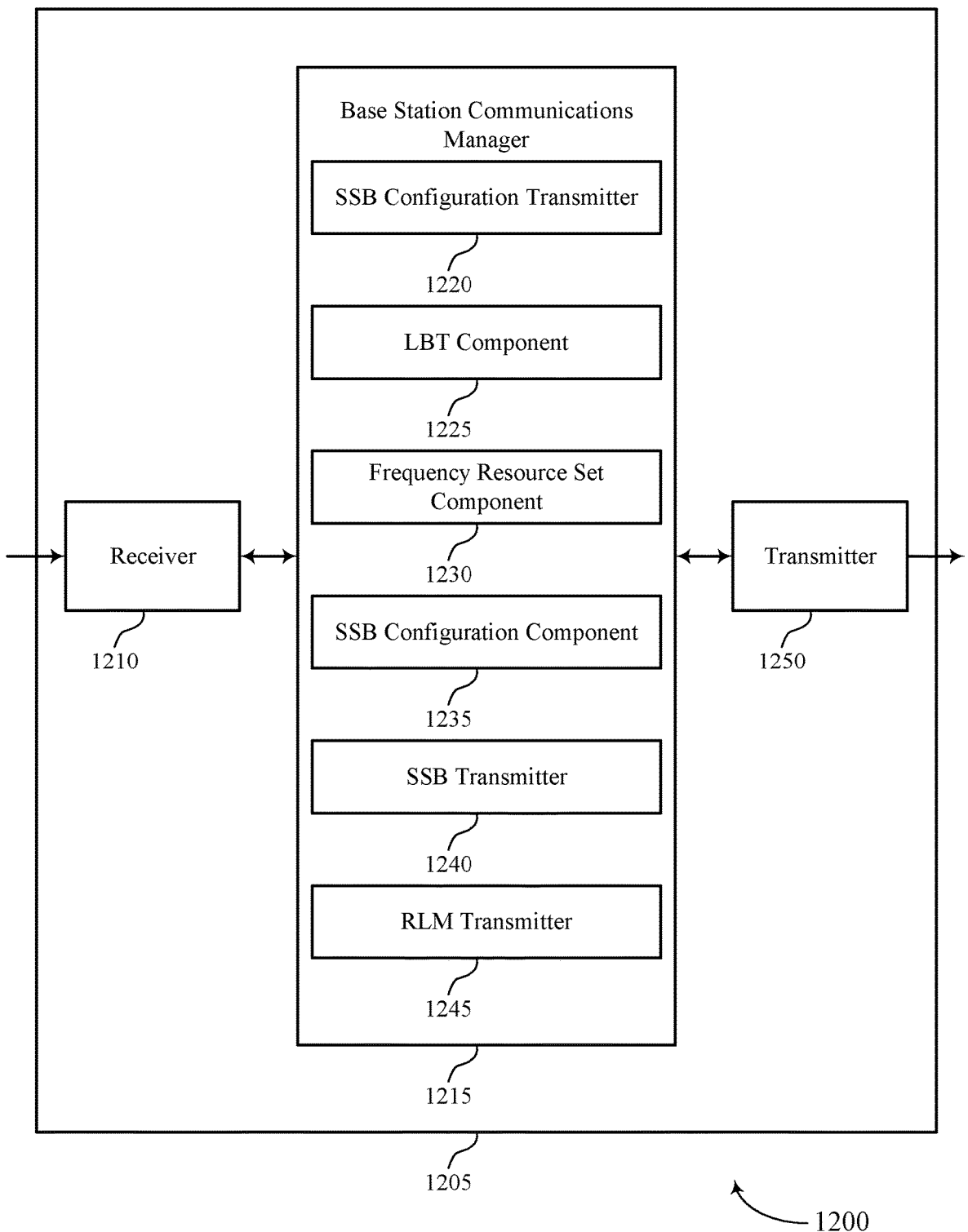

FIG. 12 shows a block diagram 1200 of a device 1205 that supports multiple BWP measurements in accordance with aspects of the present disclosure. The device 1205 may be an example of aspects of a device 1105, or a base station 105 as described herein. The device 1205 may include a receiver 1210, a base station communications manager 1215, and a transmitter 1250. The device 1205 may also include a processor. Each of these components may be in communication with one another (e.g., via one or more buses).

The receiver 1210 may receive information such as packets, user data, or control information associated with various information channels (e.g., control channels, data channels, and information related to multiple BWP measurements). Information may be passed on to other components of the device 1205. The receiver 1210 may be an example of aspects of the transceiver 1420 described with reference to FIG. 14. The receiver 1210 may utilize a single antenna or a set of antennas.

The base station communications manager 1215 may be an example of aspects of the base station communications manager 1115 as described herein. The base station communications manager 1215 may include an SSB configuration transmitter 1220, an LBT component 1225, a frequency resource set component 1230, an SSB configuration component 1235, an SSB transmitter 1240, and an RLM transmitter 1245. The base station communications manager 1215 may be an example of aspects of the base station communications manager 1410 described herein.

The SSB configuration transmitter 1220 may transmit, to a UE, a set of SSB configurations for a set of frequency resource sets configured for communications in a shared radio frequency spectrum band. The LBT component 1225 may perform an LBT procedure for the set of frequency resource sets. The frequency resource set component 1230 may select, based on a result of the performed LBT procedure, a frequency resource set of the set of frequency resource sets. The SSB configuration component 1235 may identify an SSB configuration of the set of SSB configurations that corresponds to the selected frequency resource set. The SSB transmitter 1240 may transmit, on the selected frequency resource set, an SSB according to the identified SSB configuration.

The frequency resource set component 1230 may determine, for a UE configured to use a set of frequency resource sets of a component carrier to communicate in a shared radio frequency spectrum band with the base stations, a set of time and frequency resources for the UE to monitor for reference signals for at least one frequency resource set of the set of frequency resource sets.

The RLM transmitter 1245 may transmit, to the UE, an indication of an RLM configuration for the set of frequency resource sets that indicates the determined set of time and frequency resources.

The transmitter 1250 may transmit signals generated by other components of the device 1205. In some examples, the transmitter 1250 may be collocated with a receiver 1210 in a transceiver module. For example, the transmitter 1250 may be an example of aspects of the transceiver 1420 described with reference to FIG. 14. The transmitter 1250 may utilize a single antenna or a set of antennas.

Figure 13:
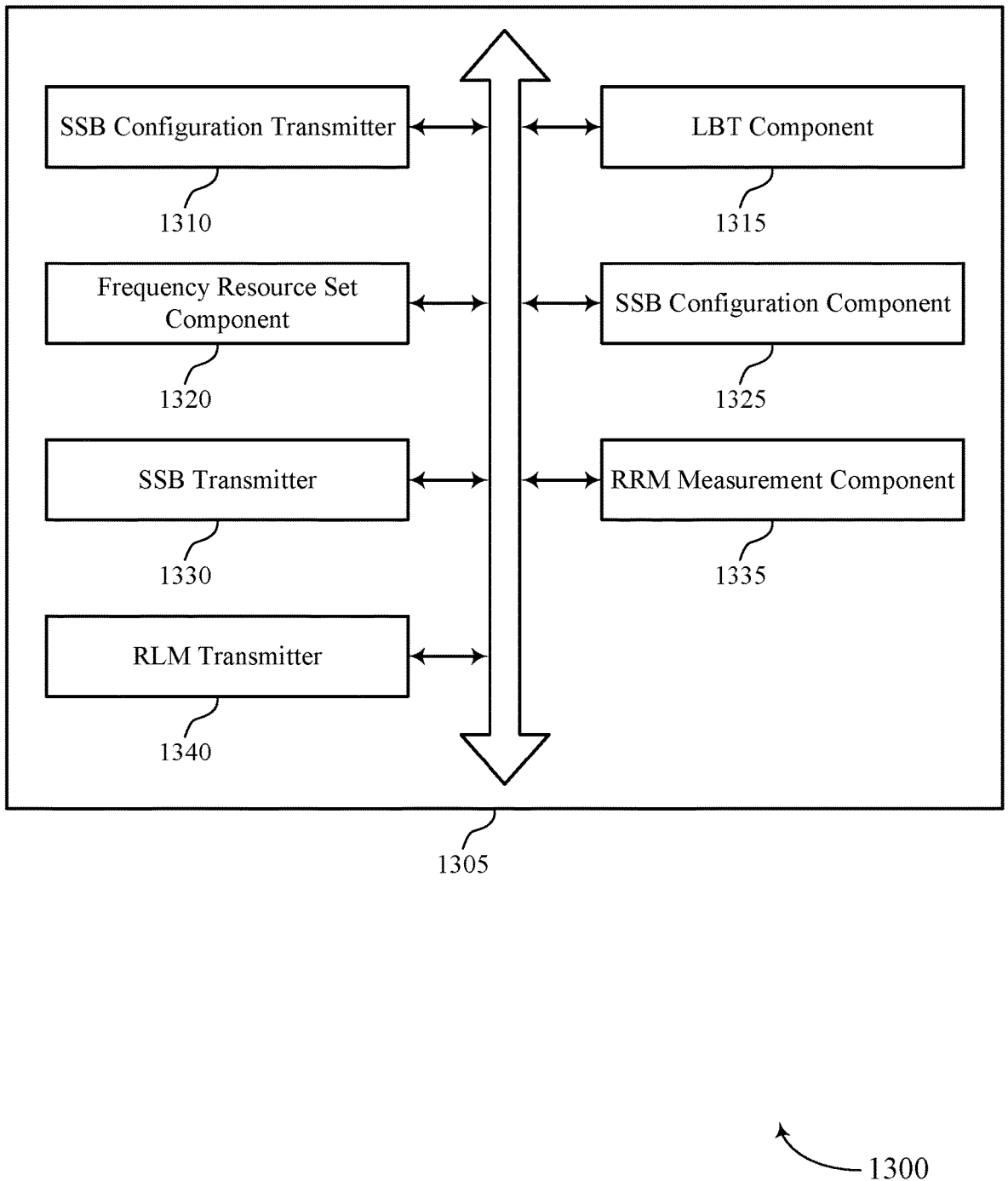
FIG. 13 shows a block diagram of a base station communications manager that supports multiple BWP measurements in accordance with aspects of the present disclosure.

FIG. 13 shows a block diagram 1300 of a base station communications manager 1305 that supports multiple BWP measurements in accordance with aspects of the present disclosure. The base station communications manager 1305 may be an example of aspects of a base station communications manager 1115, a base station communications manager 1215, or a base station communications manager 1410 described herein. The base station communications manager 1305 may include an SSB configuration transmitter 1310, an LBT component 1315, a frequency resource set component 1320, an SSB configuration component 1325, an SSB transmitter 1330, an RRM measurement component 1335, and an RLM transmitter 1340. Each of these modules may communicate, directly or indirectly, with one another (e.g., via one or more buses).

The SSB configuration transmitter 1310 may transmit, to a UE, a set of SSB configurations for a set of frequency resource sets configured for communications in a shared radio frequency spectrum band. In some examples, the set of frequency resource sets includes a set of BWPs, or a set of sub-bands, or a combination thereof. In some examples, the set of frequency resource sets include a set of BWPs, and the at least one frequency resource set includes at least one of the set of BWPS. In some examples, the SSB configuration transmitter 1310 may transmit radio resource control signaling, or system information block signaling, or a combination thereof, that indicates the set of SSB configurations. In some cases, each of the set SSB configurations correspond to at least one of the set of frequency resource sets. In some cases, at least a first of the set of SSB configurations indicates an SSB configuration that floats relative to a measurement time configuration window, and at least a second of the set of SSB configurations indicates an SSB configuration that is fixed relative to the measurement time configuration window. In some cases, a first SSB configuration of the set of SSB configurations indicates a first SSB periodicity, and a second SSB configuration of the set of SSB configurations indicates a second SSB periodicity different from the first SSB periodicity.

The LBT component 1315 may perform an LBT procedure for the set of frequency resource sets. In some examples, the LBT component 1315 may perform the LBT procedure separately for each of the set of frequency resource sets.

The frequency resource set component 1320 may select, based on a result of the performed LBT procedure, a frequency resource set of the set of frequency resource sets. In some examples, the frequency resource set component 1320 may determine, for a UE configured to use a set of frequency resource sets of a component carrier to communicate in a shared radio frequency spectrum band with the base stations, a set of time and frequency resources for the UE to monitor for reference signals for at least one frequency resource set of the set of frequency resource sets. In some examples, the selected frequency resource set includes one of the set of BWPs, or the set of sub-bands, or the combination thereof. In some cases, the reference signals include SSBs.

In some examples, the set of frequency resource sets includes a set of BWPs, or a set of sub-bands, or a combination thereof. In some examples, the set of frequency resource sets include a set of BWPs, and the at least one frequency resource set includes at least one of the set of BWPS. In some cases, the set of frequency resource sets includes a set of sub-bands, and the at least one frequency resource set includes at least one of the sets of sub-bands. In some examples, the frequency resource set component 1320 may determine the set of time and frequency resources of a single frequency resource set of the set of frequency resource sets to monitor for reference signals, the transmitted indication identifying that one frequency resource set is to be monitored. In some examples, the frequency resource set component 1320 may determine the set of time and frequency resources of the set of frequency resource sets for the UE to use to monitor for reference signals, the transmitted indication identifying that multiple frequency resource sets are to be monitored. In some examples, the frequency resource set component 1320 may determine a TDM pattern of time and frequency resources of the set of frequency resource sets for the UE to monitor for reference signals, the set of time and frequency resources including at least one set of time and frequency resources in each of the set of frequency resource sets.

The SSB configuration component 1325 may identify an SSB configuration of the set of SSB configurations that corresponds to the selected frequency resource set. In some examples, the SSB configuration component 1325 may transmit an indication that the transmitted SSB is fixed relative to a measurement time window. In some examples, the SSB configuration component 1325 may transmit, to the UE, an identification of one or more of the frequency resource sets of the set of frequency resource sets that the UE is to assume float relative to a measurement time configuration window. In some examples, the SSB configuration component 1325 may transmit, to the UE, an identification of one or more of the frequency resource sets of the set of frequency resource sets that the UE is to assume is fixed relative to a measurement time configuration window.

In some examples, the SSB configuration component 1325 may transmit, to the UE and for each of the set of frequency resource sets, an indication of whether the base station will transmit SSBs in the frequency resource set according to a timing that is fixed or floating relative to a measurement time configuration window.

The SSB transmitter 1330 may transmit, on the selected frequency resource set, an SSB according to the identified SSB configuration.

The RLM transmitter 1340 may transmit, to the UE, an indication of an RLM configuration for the set of frequency resource sets that indicates the determined set of time and frequency resources. In some examples, the at least one frequency resource set includes one of at least one of the set of BWPs, or at least one of the set of sub-bands, or the combination thereof. In some cases, the transmitted indication identifies the at least one frequency resource set of the set of frequency resource sets to be monitored by the UE.

The RRM measurement component 1335 may transmit, to the UE, an indication of an order of priority for the set of frequency resource sets, a first frequency resource set of the set of frequency resource sets having a higher priority than a second frequency resource set of the set of frequency resource sets. In some examples, the RRM measurement component 1335 may receive, from the UE, a report that separately indicates values of a channel quality metric for the selected frequency resource set and at least one additional frequency resource set. In some examples, the RRM measurement component 1335 may receive, from the UE, a report that indicates a combined value of a channel quality metric for the set of frequency resource sets.

Figure 14:
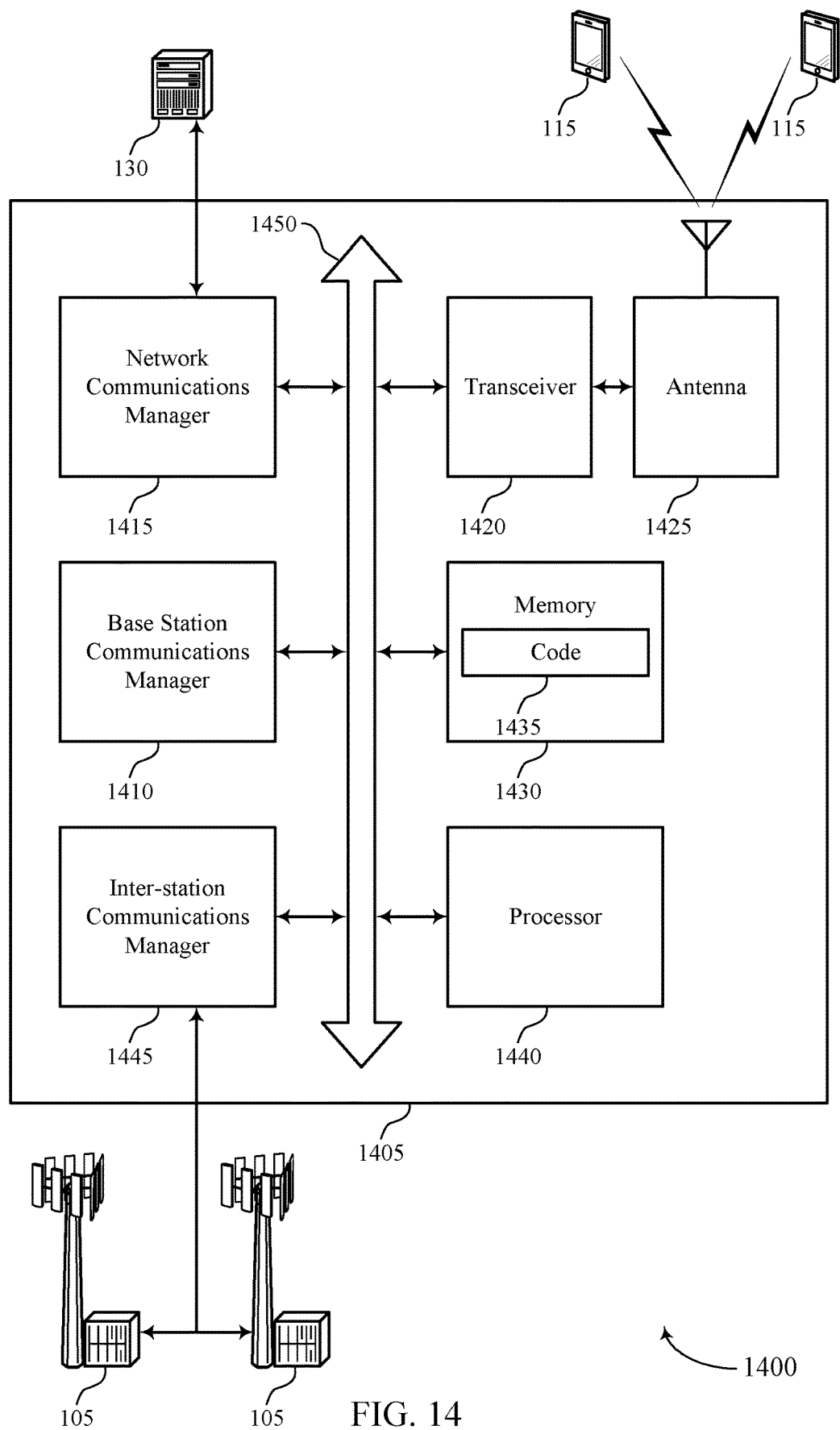
FIG. 14 shows a diagram of a system including a device that supports multiple BWP measurements in accordance with aspects of the present disclosure.

FIG. 14 shows a diagram of a system 1400 including a device 1405 that supports multiple BWP measurements in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a base station communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The base station communications manager 1410 may transmit, to a UE, a set of SSB configurations for a set of frequency resource sets configured for communications in a shared radio frequency spectrum band. In some cases, the base station communications manager 1410 may perform an LBT procedure for the set of frequency resource sets. Accordingly, the base station communications manager 1410 may select, based on a result of the performed LBT procedure, a frequency resource set of the set of frequency resource sets. Additionally, the base station communications manager 1410 may identify an SSB configuration of the set of SSB configurations that corresponds to the selected frequency resource set. In some cases, the base station communications manager 1410 may transmit, on the selected frequency resource set, an SSB according to the identified SSB configuration.

Additionally or alternatively, the base station communications manager 1410 may determine, for a UE configured to use a set of frequency resource sets of a component carrier to communicate in a shared radio frequency spectrum band with the base stations, a set of time and frequency resources for the UE to monitor for reference signals for at least one frequency resource set of the set of frequency resource sets. In some cases, the base station communications manager 1410 may transmit, to the UE, an indication of an RLM configuration for the set of frequency resource sets that indicates the determined set of time and frequency resources.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting multiple BWP measurements).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
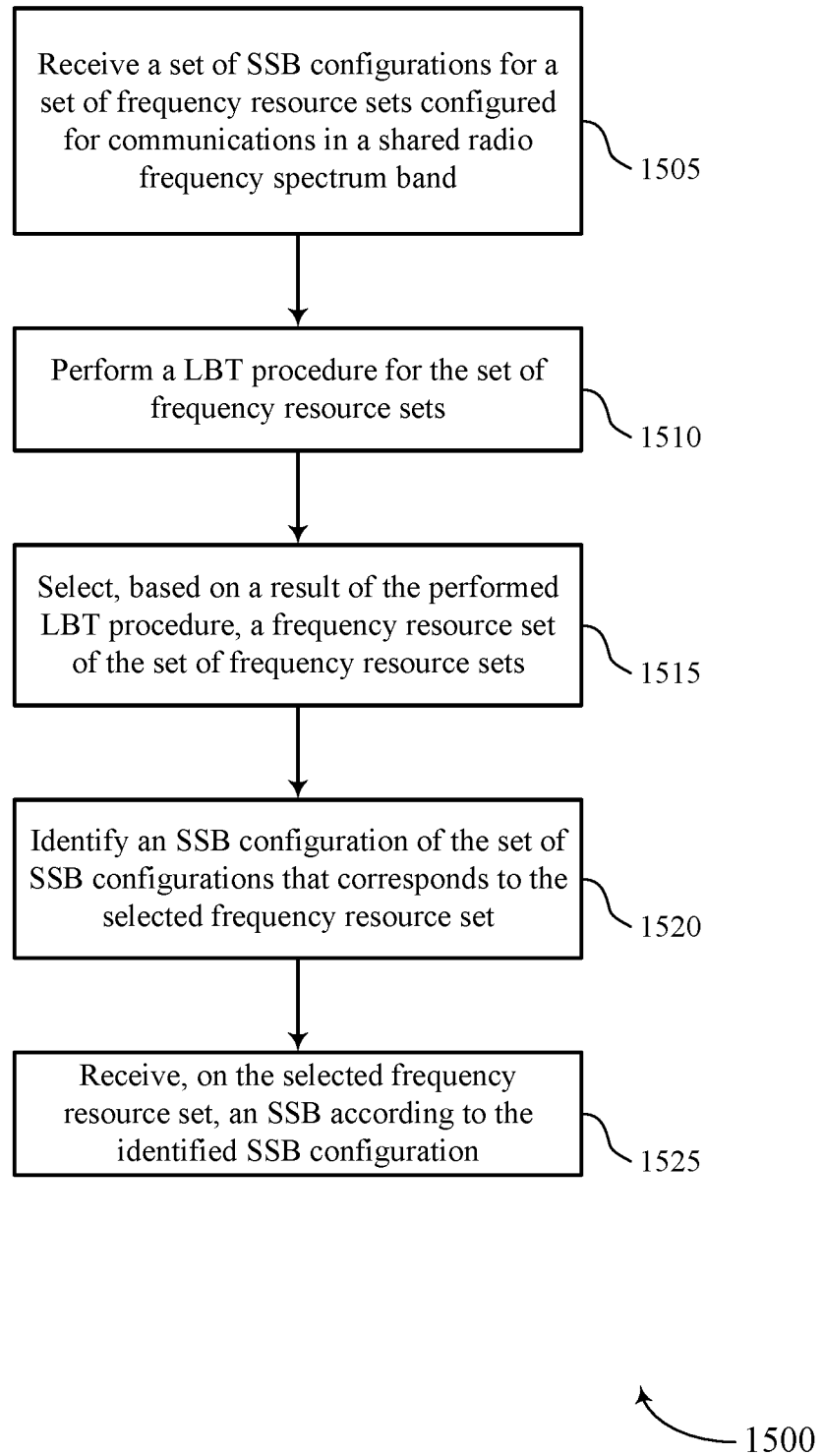
FIGS. 15 through 20 show flowcharts illustrating methods that support multiple BWP measurements in accordance with aspects of the present disclosure.

FIG. 15 shows a flowchart illustrating a method 1500 that supports multiple BWP measurements in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive a set of SSB configurations for a set of frequency resource sets configured for communications in a shared radio frequency spectrum band. The operations of 1505 may be performed according to the methods described herein. In some examples, aspects of the operations of 1505 may be performed by an SSB configuration receiver as described with reference to FIGS. 7 through 10.

At 1510, the UE may perform an LBT procedure for the set of frequency resource sets. The operations of 1510 may be performed according to the methods described herein. In some examples, aspects of the operations of 1510 may be performed by an LBT procedure component as described with reference to FIGS. 7 through 10.

At 1515, the UE may select, based on a result of the performed LBT procedure, a frequency resource set of the set of frequency resource sets. The operations of 1515 may be performed according to the methods described herein. In some examples, aspects of the operations of 1515 may be performed by a resource set component as described with reference to FIGS. 7 through 10.

At 1520, the UE may identify an SSB configuration of the set of SSB configurations that corresponds to the selected frequency resource set. The operations of 1520 may be performed according to the methods described herein. In some examples, aspects of the operations of 1520 may be performed by an SSB configuration identifier as described with reference to FIGS. 7 through 10.

At 1525, the UE may receive, on the selected frequency resource set, an SSB according to the identified SSB configuration. The operations of 1525 may be performed according to the methods described herein. In some examples, aspects of the operations of 1525 may be performed by an SSB receiver as described with reference to FIGS. 7 through 10.

Figure 16:
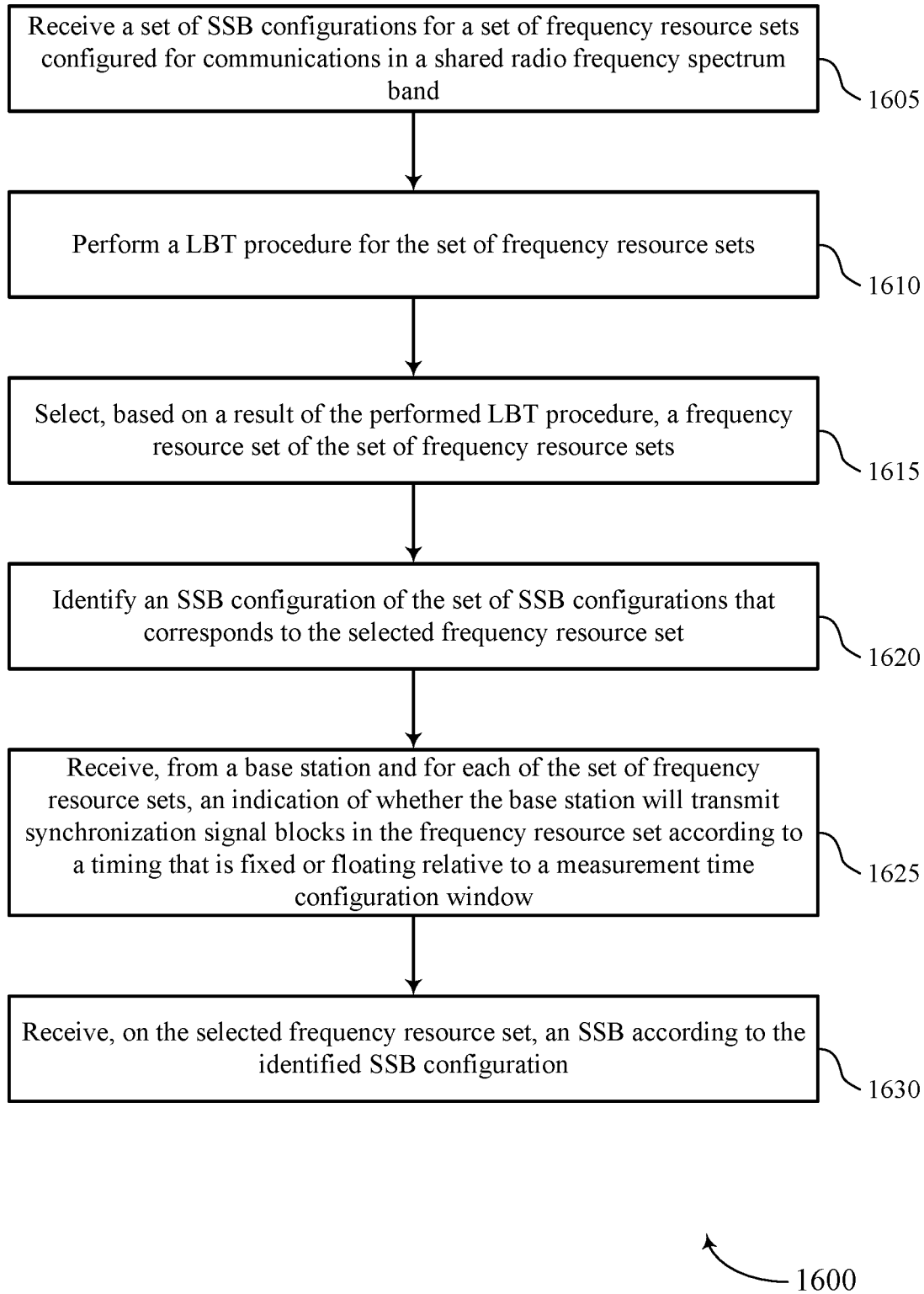

FIG. 16 shows a flowchart illustrating a method 1600 that supports multiple BWP measurements in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive a set of SSB configurations for a set of frequency resource sets configured for communications in a shared radio frequency spectrum band. The operations of 1605 may be performed according to the methods described herein. In some examples, aspects of the operations of 1605 may be performed by an SSB configuration receiver as described with reference to FIGS. 7 through 10.

At 1610, the UE may perform an LBT procedure for the set of frequency resource sets. The operations of 1610 may be performed according to the methods described herein. In some examples, aspects of the operations of 1610 may be performed by an LBT procedure component as described with reference to FIGS. 7 through 10.

At 1615, the UE may select, based on a result of the performed LBT procedure, a frequency resource set of the set of frequency resource sets. The operations of 1615 may be performed according to the methods described herein. In some examples, aspects of the operations of 1615 may be performed by a resource set component as described with reference to FIGS. 7 through 10.

At 1620, the UE may identify an SSB configuration of the set of SSB configurations that corresponds to the selected frequency resource set. The operations of 1620 may be performed according to the methods described herein. In some examples, aspects of the operations of 1620 may be performed by an SSB configuration identifier as described with reference to FIGS. 7 through 10.

At 1625, the UE may receive, from a base station and for each of the set of frequency resource sets, an indication of whether the base station will transmit SSBs in the frequency resource set according to a timing that is fixed or floating relative to a measurement time configuration window. The operations of 1625 may be performed according to the methods described herein. In some examples, aspects of the operations of 1625 may be performed by an SSB configuration identifier as described with reference to FIGS. 7 through 10.

At 1630, the UE may receive, on the selected frequency resource set, an SSB according to the identified SSB configuration. The operations of 1630 may be performed according to the methods described herein. In some examples, aspects of the operations of 1630 may be performed by an SSB receiver as described with reference to FIGS. 7 through 10.

Figure 17:
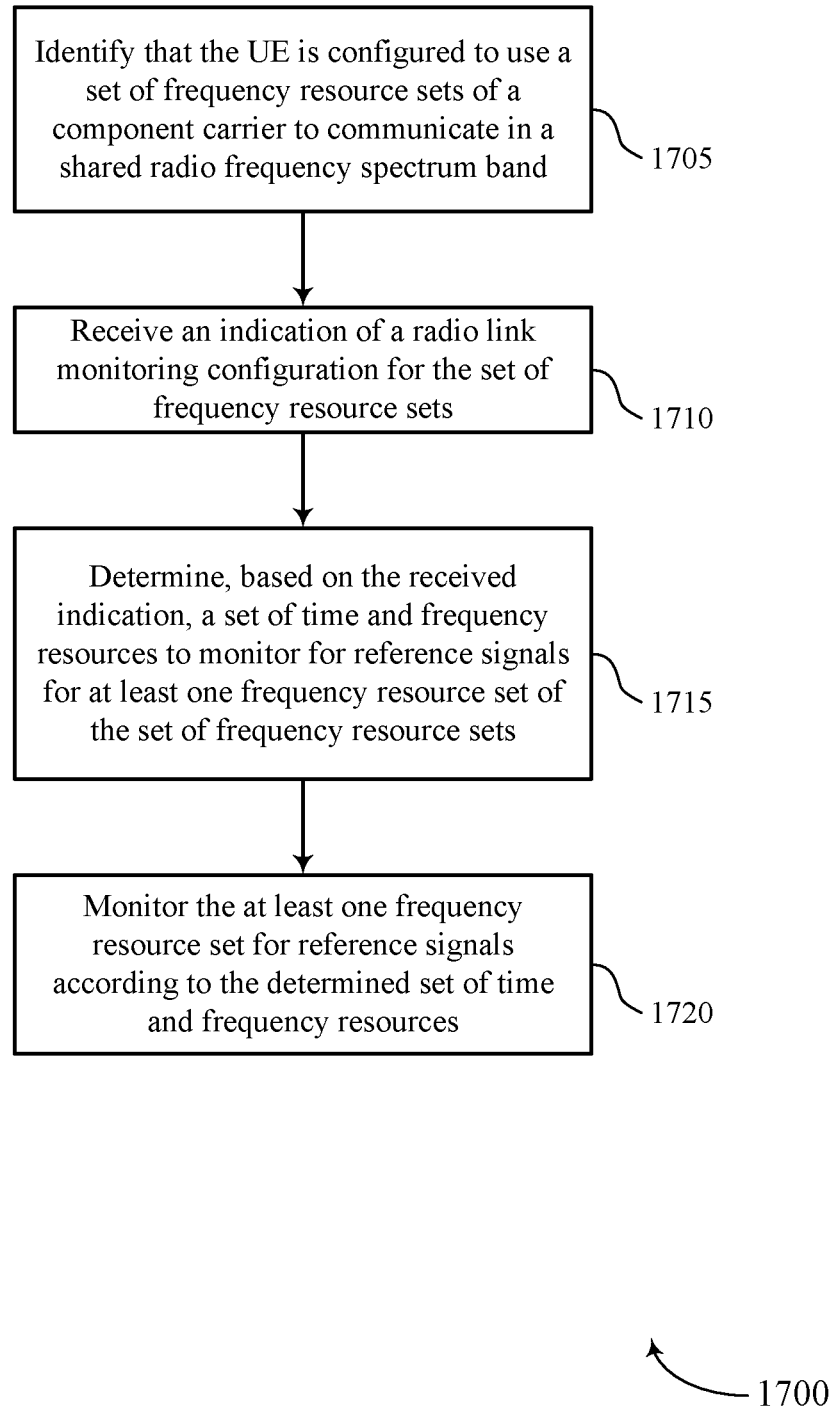

FIG. 17 shows a flowchart illustrating a method 1700 that supports multiple BWP measurements in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may identify that the UE is configured to use a set of frequency resource sets of a component carrier to communicate in a shared radio frequency spectrum band. The operations of 1705 may be performed according to the methods described herein. In some examples, aspects of the operations of 1705 may be performed by a resource set component as described with reference to FIGS. 7 through 10.

At 1710, the UE may receive an indication of an RLM configuration for the set of frequency resource sets. The operations of 1710 may be performed according to the methods described herein. In some examples, aspects of the operations of 1710 may be performed by an RLM component as described with reference to FIGS. 7 through 10.

At 1715, the UE may determine, based on the received indication, a set of time and frequency resources to monitor for reference signals for at least one frequency resource set of the set of frequency resource sets. The operations of 1715 may be performed according to the methods described herein. In some examples, aspects of the operations of 1715 may be performed by a monitoring component as described with reference to FIGS. 7 through 10.

At 1720, the UE may monitor the at least one frequency resource set for reference signals according to the determined set of time and frequency resources. The operations of 1720 may be performed according to the methods described herein. In some examples, aspects of the operations of 1720 may be performed by a monitoring component as described with reference to FIGS. 7 through 10.

Figure 18:
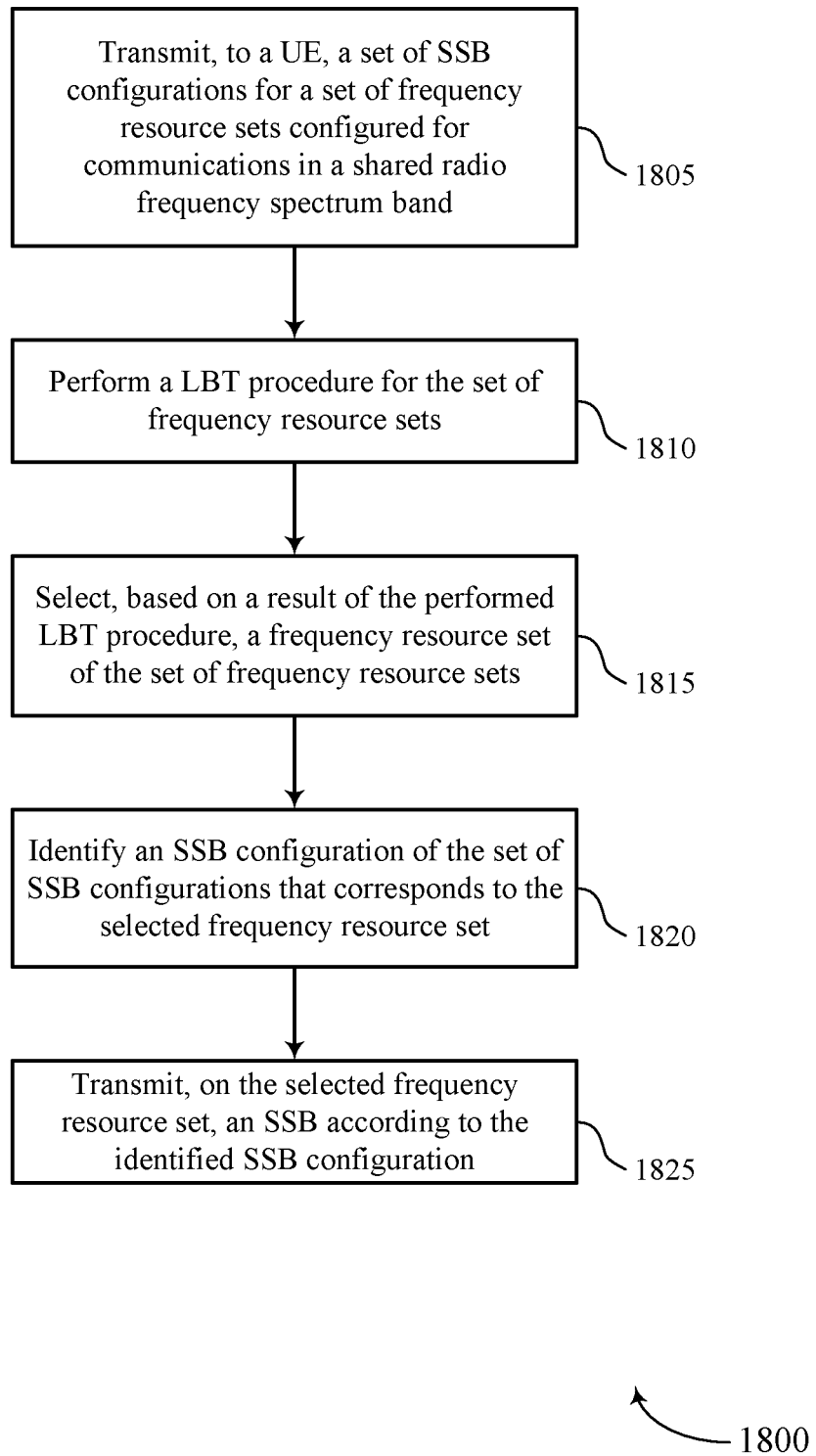

FIG. 18 shows a flowchart illustrating a method 1800 that supports multiple BWP measurements in accordance with aspects of the present disclosure. The operations of method 1800 may be implemented by a base station 105 or its components as described herein. For example, the operations of method 1800 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, a set of SSB configurations for a set of frequency resource sets configured for communications in a shared radio frequency spectrum band. The operations of 1805 may be performed according to the methods described herein. In some examples, aspects of the operations of 1805 may be performed by an SSB configuration transmitter as described with reference to FIGS. 11 through 14.

At 1810, the base station may perform an LBT procedure for the set of frequency resource sets. The operations of 1810 may be performed according to the methods described herein. In some examples, aspects of the operations of 1810 may be performed by an LBT component as described with reference to FIGS. 11 through 14.

At 1815, the base station may select, based on a result of the performed LBT procedure, a frequency resource set of the set of frequency resource sets. The operations of 1815 may be performed according to the methods described herein. In some examples, aspects of the operations of 1815 may be performed by a frequency resource set component as described with reference to FIGS. 11 through 14.

At 1820, the base station may identify an SSB configuration of the set of SSB configurations that corresponds to the selected frequency resource set. The operations of 1820 may be performed according to the methods described herein. In some examples, aspects of the operations of 1820 may be performed by an SSB configuration component as described with reference to FIGS. 11 through 14.

At 1825, the base station may transmit, on the selected frequency resource set, an SSB according to the identified SSB configuration. The operations of 1825 may be performed according to the methods described herein. In some examples, aspects of the operations of 1825 may be performed by an SSB transmitter as described with reference to FIGS. 11 through 14.

Figure 19:
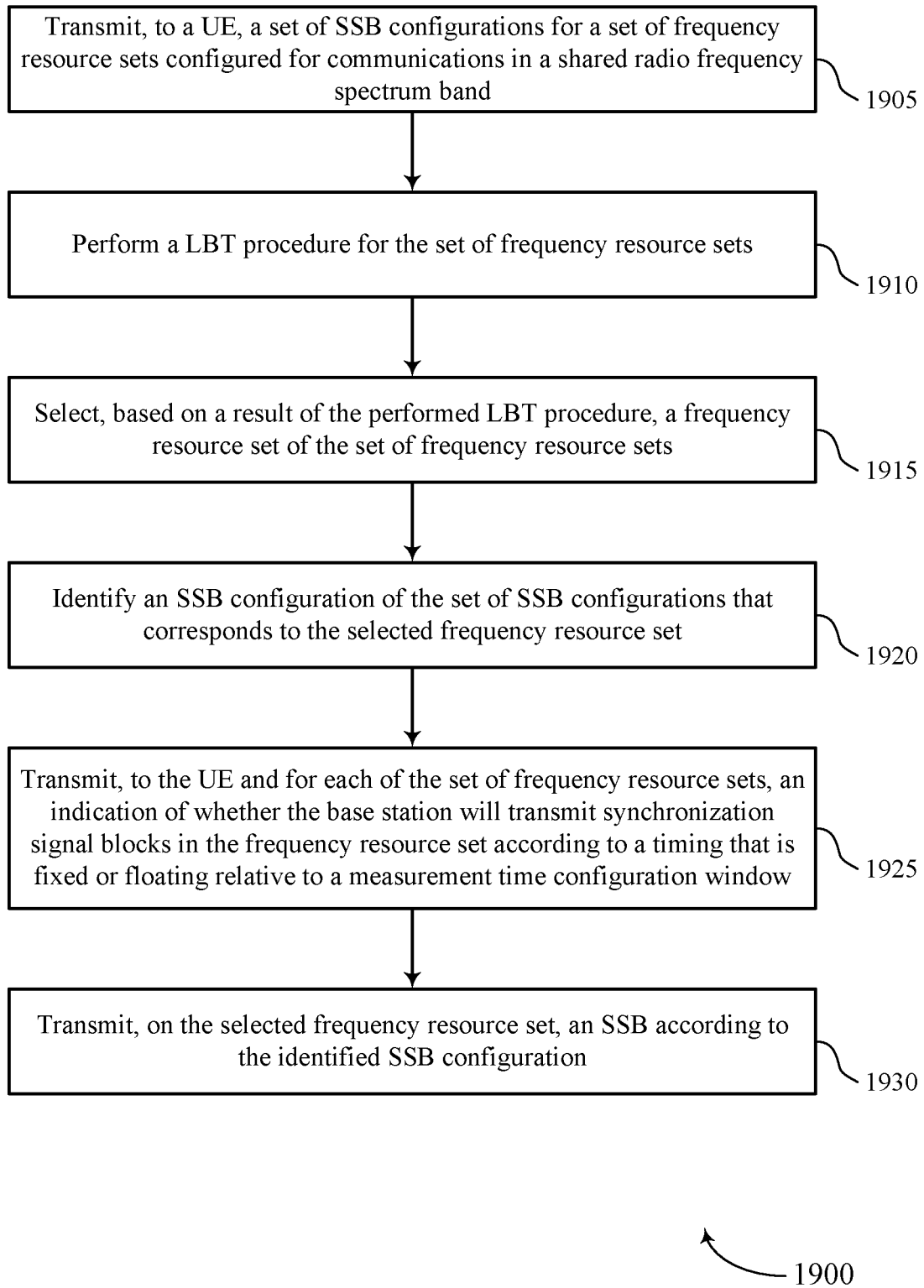

FIG. 19 shows a flowchart illustrating a method 1900 that supports multiple BWP measurements in accordance with aspects of the present disclosure. The operations of method 1900 may be implemented by a base station 105 or its components as described herein. For example, the operations of method 1900 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, a set of SSB configurations for a set of frequency resource sets configured for communications in a shared radio frequency spectrum band. The operations of 1905 may be performed according to the methods described herein. In some examples, aspects of the operations of 1905 may be performed by an SSB configuration transmitter as described with reference to FIGS. 11 through 14.

At 1910, the base station may perform an LBT procedure for the set of frequency resource sets. The operations of 1910 may be performed according to the methods described herein. In some examples, aspects of the operations of 1910 may be performed by an LBT component as described with reference to FIGS. 11 through 14.

At 1915, the base station may select, based on a result of the performed LBT procedure, a frequency resource set of the set of frequency resource sets. The operations of 1915 may be performed according to the methods described herein. In some examples, aspects of the operations of 1915 may be performed by a frequency resource set component as described with reference to FIGS. 11 through 14.

At 1920, the base station may identify an SSB configuration of the set of SSB configurations that corresponds to the selected frequency resource set. The operations of 1920 may be performed according to the methods described herein. In some examples, aspects of the operations of 1920 may be performed by an SSB configuration component as described with reference to FIGS. 11 through 14.

At 1925, the base station may transmit, to the UE and for each of the set of frequency resource sets, an indication of whether the base station will transmit SSBs in the frequency resource set according to a timing that is fixed or floating relative to a measurement time configuration window. The operations of 1925 may be performed according to the methods described herein. In some examples, aspects of the operations of 1925 may be performed by an SSB configuration component as described with reference to FIGS. 11 through 14.

At 1930, the base station may transmit, on the selected frequency resource set, an SSB according to the identified SSB configuration. The operations of 1930 may be performed according to the methods described herein. In some examples, aspects of the operations of 1930 may be performed by an SSB transmitter as described with reference to FIGS. 11 through 14.

Figure 20:
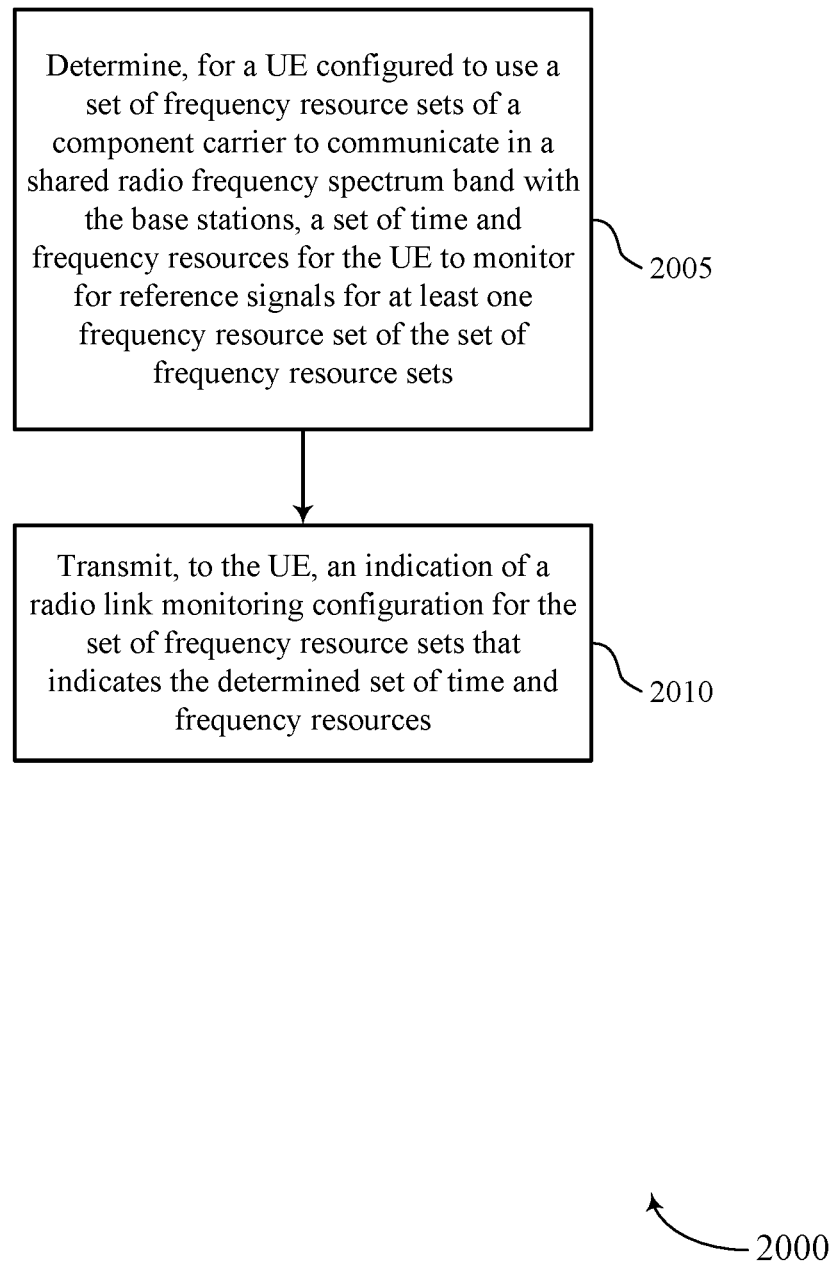

FIG. 20 shows a flowchart illustrating a method 2000 that supports multiple BWP measurements in accordance with aspects of the present disclosure. The operations of method 2000 may be implemented by a base station 105 or its components as described herein. For example, the operations of method 2000 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may determine, for a UE configured to use a set of frequency resource sets of a component carrier to communicate in a shared radio frequency spectrum band with the base stations, a set of time and frequency resources for the UE to monitor for reference signals for at least one frequency resource set of the set of frequency resource sets. The operations of 2005 may be performed according to the methods described herein. In some examples, aspects of the operations of 2005 may be performed by a frequency resource set component as described with reference to FIGS. 11 through 14.

At 2010, the base station may transmit, to the UE, an indication of an RLM configuration for the set of frequency resource sets that indicates the determined set of time and frequency resources. The operations of 2010 may be performed according to the methods described herein. In some examples, aspects of the operations of 2010 may be performed by an RLM transmitter as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying that the UE is configured to use a plurality of frequency resource sets of a component carrier to communicate in a shared radio frequency spectrum band;
    receiving an indication of a radio link monitoring configuration for the plurality of frequency resource sets;
    performing a separate listen-before-talk procedure for each resource set of the plurality of frequency resource sets;
    selecting at least one frequency resource set of the plurality of frequency resource sets for monitoring based at least in part on the separate listen-before-talk procedure;
    determining, based at least in part on the received indication and the separate listen-before-talk procedure performed for each resource set of the plurality of frequency resource sets, a set of time and frequency resources to monitor for reference signals for the at least one frequency resource set of the plurality of frequency resource sets, wherein the selected at least one frequency resource set of the plurality of frequency resource sets corresponds to respective configurations for receiving the reference signals; and
    monitoring the selected at least one frequency resource set for reference signals according to the determined set of time and frequency resources based at least in part on the separate listen-before-talk procedure performed for each resource set of the plurality of frequency resource sets, the respective configurations for the selected at least one frequency resource set that are selected based at least in part on the separate listen-before-talk procedure performed for each resource set of the plurality of frequency resource sets, and a time division multiplexed pattern.

2. The method of claim 1, wherein the plurality of frequency resource sets comprise a plurality of bandwidth parts, and the at least one frequency resource set comprises at least one of the plurality of bandwidth parts.

3. The method of claim 1, wherein the plurality of frequency resource sets comprise a plurality of sub-bands, and the at least one frequency resource set comprises at least one of the plurality of sub-bands.

4. The method of claim 1, wherein the received indication identifies the at least one frequency resource set of the plurality of frequency resource sets to be monitored by the UE.

5. The method of claim 1, wherein determining the set of time and frequency resources to monitor for reference signals comprises:
    determining the set of time and frequency resources of a single frequency resource set of the plurality of frequency resource sets to monitor for reference signals, the received indication identifying that one frequency resource set is to be monitored.

6. The method of claim 1, wherein determining the set of time and frequency resources to monitor for reference signals comprises:
    determining the set of time and frequency resources of the plurality of frequency resource sets to monitor for reference signals, the received indication identifying that multiple frequency resource sets are to be monitored.

7. The method of claim 1, wherein determining the set of time and frequency resources to monitor for reference signals comprises:
    determining, based at least in part on the received indication of the radio link monitoring configuration, a time division multiplexed pattern of time and frequency resources of the plurality of frequency resource sets to be monitored for reference signals, the set of time and frequency resources comprising at least one set of time and frequency resources in each of the plurality of frequency resource sets, wherein the time division multiplexed pattern comprises a multiplexing pattern of the selected at least one frequency resource set to be monitored for the reference signals.

8. The method of claim 1, further comprising:
    receiving one or more reference signals on a plurality of frequency resource sets of the at least one frequency resource set;
    determining, based at least in part on the received one or more reference signals, a link quality value for each of the plurality of frequency resource sets; and
    identifying whether the UE is synchronized based at least in part on the determined link quality values.

9. The method of claim 8, wherein identifying whether the UE is synchronized based at least in part on the determined link quality values comprises:
    identifying that the UE is synchronized based at least in part on determining that each of the plurality of determined link quality values satisfy a link quality threshold; or
    identifying that the UE is not synchronized based at least in part on determining that all of the plurality of determined link quality values fail to satisfy the link quality threshold.

10. The method of claim 1, further comprising:
    identifying a frequency resource set of the plurality of frequency resource sets that lacks a configuration for reference signal monitoring; and
    determining a link quality for the identified frequency resource set based at least in part on a transmission configuration state for the identified frequency resource set.

11. The method of claim 1, further comprising:
    determining a link quality associated with each of the at least one frequency resource set; and
    transmitting a report of the determined link quality.

12. The method of claim 11, further comprising:
    receiving, in response to the transmitted report, a command for the UE to deactivate one or more of the plurality of frequency resource sets.

13. The method of claim 1, wherein the shared radio frequency spectrum band comprises an unlicensed radio frequency spectrum band, or a shared licensed radio frequency spectrum band, or a combination thereof.

14. The method of claim 1, wherein the reference signals comprise synchronization signal blocks.

15. The method of claim 1, further comprising:
    performing separate listen-before-talk procedure for each resource set of the plurality of frequency resource sets, a successful listen-before-talk procedure based at least in part on the UE performing the listen-before-talk procedures, wherein determining the set of time and frequency resources is based at least in part on the successful listen-before-talk procedures.

16. The method of claim 1, wherein the set of time and frequency resources are determined by the UE based at least in part on the indication of the plurality of frequency resource sets, the indication of the plurality of frequency resource sets indicating a successful listen-before-talk procedure for each resource set of the plurality of frequency resource sets.

17. A method for wireless communication at a base station, comprising:
   determining, for a user equipment (UE) configured to use a plurality of frequency resource sets of a component carrier to communicate in a shared radio frequency spectrum band with the base station, a set of time and frequency resources for the UE to monitor for reference signals for at least one frequency resource set of the plurality of frequency resource sets based at least in part on a separate listen-before-talk procedure performed for each resource set of the plurality of frequency resource sets, wherein the at least one frequency resource set of the plurality of frequency resource sets corresponds to respective configuration for transmitting the reference signals; and
   transmitting, to the UE, an indication of a radio link monitoring configuration for the plurality of frequency resource sets that indicates the determined set of time and frequency resources based at least in part on the on the separate listen-before-talk procedure performed for each resource set of the plurality of frequency resource sets, the respective configurations for the at least one frequency resource set that are determined based at least in part on the separate listen-before-talk procedure performed for each resource set of the plurality of frequency resource sets, and a time division multiplexed pattern.

18. The method of claim 17, wherein the plurality of frequency resource sets comprise a plurality of bandwidth parts, and the at least one frequency resource set comprises at least one of the plurality of bandwidth parts.

19. The method of claim 17, wherein the plurality of frequency resource sets comprise a plurality of sub-bands, and the at least one frequency resource set comprises at least one of the plurality of sub-bands.

20. The method of claim 17, wherein the transmitted indication identifies the at least one frequency resource set of the plurality of frequency resource sets to be monitored by the UE.

21. The method of claim 17, wherein determining the set of time and frequency resources for the UE to monitor for reference signals comprises:
   determining the set of time and frequency resources of a single frequency resource set of the plurality of frequency resource sets to monitor for reference signals, the transmitted indication identifying that one frequency resource set is to be monitored.

22. The method of claim 17, wherein determining the set of time and frequency resources for the UE to monitor for reference signals comprises:
   determining the set of time and frequency resources of the plurality of frequency resource sets for the UE to use to monitor for reference signals, the transmitted indication identifying that multiple frequency resource sets are to be monitored.

23. The method of claim 17, wherein determining the set of time and frequency resources for the UE to monitor for reference signals comprises:
   determining a time division multiplexed pattern of time and frequency resources of the plurality of frequency resource sets for the UE to monitor for reference signals, the set of time and frequency resources comprising at least one set of time and frequency resources in each of the plurality of frequency resource sets, wherein the time division multiplexed pattern comprises a multiplexing pattern of the at least one frequency resource set to be monitored for the reference signals.

24. The method of claim 17, wherein the reference signals comprise synchronization signal blocks.

25. An apparatus for wireless communication at a user equipment (UE), comprising:
   a processor,
   memory coupled with the processor; and
   instructions stored in the memory and executable by the processor to cause the apparatus to:
      identify that the UE is configured to use a plurality of frequency resource sets of a component carrier to communicate in a shared radio frequency spectrum band;
      receive an indication of a radio link monitoring configuration for the plurality of frequency resource sets;
      perform a separate listen-before-talk procedure for each resource set of the plurality of frequency resource sets;
      select at least one frequency resource set of the plurality of frequency resource sets for monitoring based at least in part on the listen-before-talk procedure;
      determine, based at least in part on the received indication and the separate listen-before-talk procedure performed for each resource set of the plurality of frequency resource sets, a set of time and frequency resources to monitor for reference signals for the at least one frequency resource set of the plurality of frequency resource sets, wherein the selected at least one frequency resource set of the plurality of frequency resource sets corresponds to respective configurations for receiving the reference signals; and
      monitor selected the at least one frequency resource set for reference signals according to the determined set of time and frequency resources based at least in part on the separate listen-before-talk procedure performed for each resource set of the plurality of frequency resource sets, the respective configurations for the selected at least one frequency resource set that are selected based at least in part on the separate listen-before-talk procedure performed for each resource set of the plurality of frequency resource sets, and a time division multiplexed pattern.

26. The apparatus of claim 25, wherein the plurality of frequency resource sets comprise a plurality of bandwidth parts, and the at least one frequency resource set comprises at least one of the plurality of bandwidth parts.

27. The apparatus of claim 25, wherein the plurality of frequency resource sets comprise a plurality of sub-bands, and the at least one frequency resource set comprises at least one of the plurality of sub-bands.

28. The apparatus of claim 25, wherein the instructions are further executable by the processor to determine the set of time and frequency resources to monitor for reference signals by being executable by the processor to:
   determine the set of time and frequency resources of the plurality of frequency resource sets to monitor for reference signals, the received indication identifying that multiple frequency resource sets are to be monitored.

29. An apparatus for wireless communication at a base station, comprising:
a processor,
memory coupled with the processor; and
instructions stored in the memory and executable by the processor to cause the apparatus to:
determine, for a user equipment (UE) configured to use a plurality of frequency resource sets of a component carrier to communicate in a shared radio frequency spectrum band with the base station, a set of time and frequency resources for the UE to monitor for reference signals for at least one frequency resource set of the plurality of frequency resource sets based at least in part on a separate listen-before-talk procedure performed for each resource set of the plurality of frequency resource sets, wherein the at least one frequency resource set of the plurality of frequency resource sets corresponds to respective configuration for transmitting the reference signals; and
transmit, to the UE, an indication of a radio link monitoring configuration for the plurality of frequency resource sets that indicates the determined set of time and frequency resources based at least in part on the on the separate listen-before-talk procedure performed for each resource set of the plurality of frequency resource sets, the respective configurations for the at least one frequency resource set that are determined based at least in part on the separate listen-before-talk procedure performed for each resource set of the plurality of frequency resource sets, and a time division multiplexed pattern.

30. The apparatus of claim 29, wherein the plurality of frequency resource sets comprise a plurality of bandwidth parts, and the at least one frequency resource set comprises at least one of the plurality of bandwidth parts.

31. The apparatus of claim 29, wherein the plurality of frequency resource sets comprise a plurality of sub-bands, and the at least one frequency resource set comprises one of at least one of the plurality of sub-bands.

32. The apparatus of claim 29, wherein the instructions are further executable by the processor to determine the set of time and frequency resources for the UE to monitor for reference signals by being executable by the processor to:
determine the set of time and frequency resources of the plurality of frequency resource sets for the UE to use to monitor for reference signals, the transmitted indication identifying that multiple frequency resource sets are to be monitored.

* * * * *